(12) United States Patent
Shirakawa

(10) Patent No.: US 6,886,334 B2
(45) Date of Patent: May 3, 2005

(54) COMBUSTION CONTROL OF DIESEL ENGINE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/220,354

(22) PCT Filed: Apr. 3, 2002

(86) PCT No.: PCT/JP02/03352
§ 371 (c)(1),
(2), (4) Date: Aug. 30, 2002

(87) PCT Pub. No.: WO02/090744
PCT Pub. Date: Nov. 14, 2002

(65) Prior Publication Data
US 2003/0140629 A1 Jul. 31, 2003

(30) Foreign Application Priority Data
Apr. 27, 2001 (JP) ........................ 2001-131640

(51) Int. Cl.$^7$ ................. F02M 25/06; F02D 21/08; F02D 33/02; F02D 35/00; F02D 41/30
(52) U.S. Cl. ............... 60/602; 60/605.2; 123/568.21
(58) Field of Search .................... 60/602, 605.1, 60/605.2; 123/568.21

(56) References Cited

U.S. PATENT DOCUMENTS

| 6,019,094 | A | | 2/2000 | Itoyama | |
|---|---|---|---|---|---|
| 6,058,906 | A | * | 5/2000 | Yoshino | 123/568.21 |
| 6,142,117 | A | * | 11/2000 | Hori et al. | 123/568.21 |
| 6,161,519 | A | * | 12/2000 | Kimura et al. | 123/301 |
| 6,267,095 | B1 | * | 7/2001 | Ikeda et al. | 123/295 |
| 6,298,835 | B1 | * | 10/2001 | Horie et al. | 123/568.21 |
| 6,408,834 | B1 | * | 6/2002 | Brackney et al. | 123/568.21 |
| 6,606,981 | B1 | * | 8/2003 | Itoyama | 123/568.21 |
| 6,612,292 | B1 | * | 9/2003 | Shirakawa | 123/501 |

FOREIGN PATENT DOCUMENTS

| EP | 0889219 A2 | 1/1999 | |
|---|---|---|---|
| EP | 0924419 A2 | 6/1999 | |
| EP | 0940569 A2 | 9/1999 | |
| EP | 0985812 A2 | 3/2000 | |
| EP | 1001153 A1 | 5/2000 | |
| JP | 63094061 A * | 4/1988 | .......... F02M/25/06 |
| JP | 7-4287 | 1/1995 | |
| JP | 8-86251 | 4/1996 | |

* cited by examiner

Primary Examiner—Sheldon J Richter
(74) Attorney, Agent, or Firm—Foley & Lardner LLP

(57) ABSTRACT

The controller (41) selects premixed combustion or diffusive combustion of the diesel engine (1) based on the running state detected by a sensor (33, 34) (S4, S5). The controller (41) calculates the target oxygen concentration and the target oxygen amount of the intake gas for the selected combustion type. When premixed combustion is selected, the controller (41) preferentially controls the oxygen concentration of the intake gas to the target value. When diffusive combustion is selected, the controller (41) preferentially controls the oxygen amount of the intake gas to the target value. By immediately shifting the target values according to the combustion type without setting transitional target values, increase of noxious substances in the exhaust gas due to the shift of combustion type can be prevented.

18 Claims, 22 Drawing Sheets

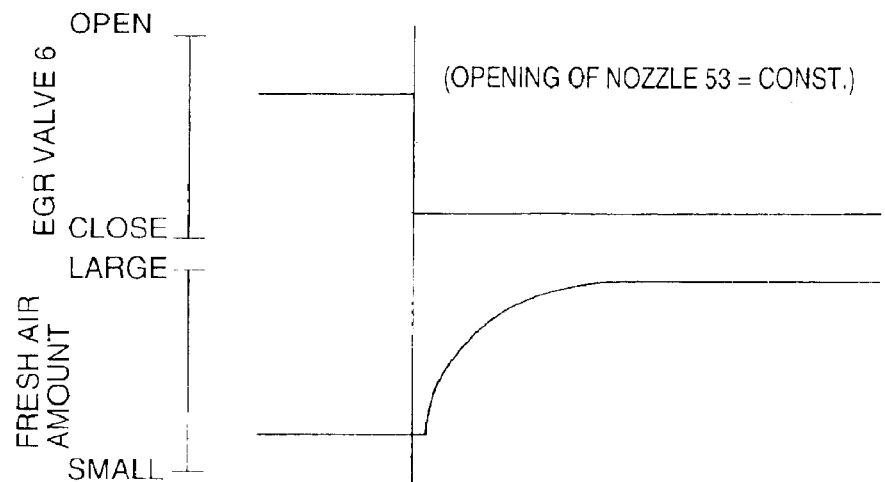
FIG. 3A
FIG. 3B
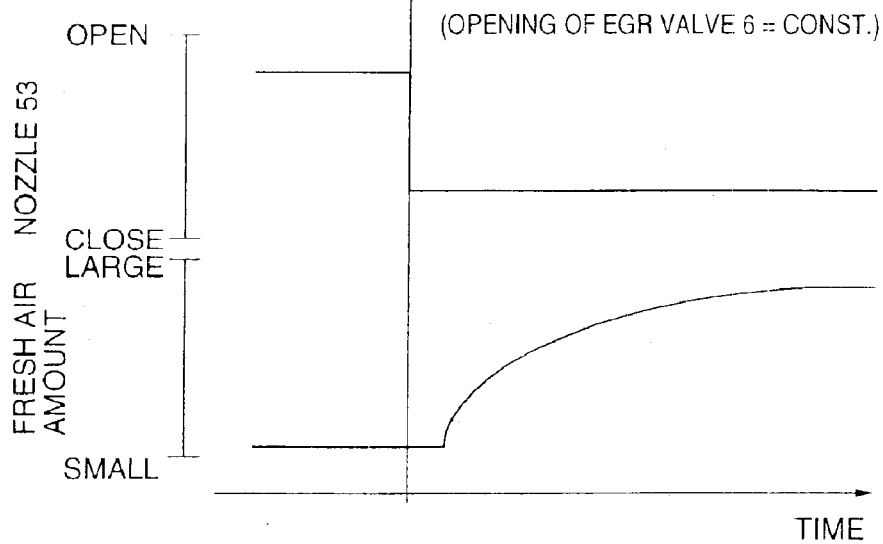
FIG. 3C
FIG. 3D

COMBUSTION CONTROL OF DIESEL ENGINE

FIELD OF THE INVENTION

This invention relates to the combustion control of a diesel engine.

BACKGROUND OF THE INVENTION

In a conventional diesel engine, combustion of fuel is generally performed in the form of diffusive combustion.

Tokkai Hei 7-4287 published by the Japanese Patent Office in 1995 has proposed applying low temperature premixed combustion to a direct injection diesel engine in order to reduce nitrogen oxides (NOx) and particulate matter (PM). According to this prior art technique, the oxygen concentration of cylinder intake air is reduced and the combustion temperature of the air-fuel mixture is reduced by an exhaust gas recirculation (EGR) system. The ignition delay of the injected fuel is largely lengthened, and mixing of fuel and cylinder intake air before ignition is promoted.

The fall of combustion temperature causes a reduction of NOx, and promotion of fuel and cylinder intake air before ignition causes a reduction of PM.

In order to realize low temperature premixed combustion, the combustion temperature and ignition delay period must be controlled within fixed limits. In the heavy load region or high rotation speed region of an engine, it is difficult to satisfy these conditions due to temperature rise of the recirculated exhaust gas. Thus, in diesel engines using this prior art technique, diffusive combustion is performed in the high load region or high rotation speed region.

SUMMARY OF THE INVENTION

According to this prior art technique, when there is a shift from premixed combustion to diffusive combustion or vice versa, the excess air factor of air-fuel mixture and the EGR rate are gradually changed. Herein, the excess air factor is directly related to the oxygen amount contained in the cylinder intake air, and the EGR rate is directly related to the oxygen concentration of the cylinder intake air.

However, according to the research of the Inventor, between premixed combustion and diffusive combustion, there is no intermediate combustion state where both are performed in parallel, and the NOx or PM discharge amount increases during the shift of combustion mode.

It is therefore an object of this invention to reduce the discharge of NOx or PM accompanying a shift from premixed combustion to diffusive combustion or vice versa.

In order to achieve the above object, this invention provides a combustion control device of such a diesel engine that performs combustion of a mixture of a fuel and an aspirated gas. The control device comprises a mechanism which regulates an oxygen concentration of the aspirated gas based on a target oxygen concentration and an oxygen amount of the aspirated gas based on a target oxygen amount, a sensor which detects a running state of the engine and a programmable controller.

The controller is programmed to select any one of a diffusive combustion and a premixed combustion with respect to the combustion of the mixture based on the running state of the engine, calculate, when the diffusive combustion is selected, the target oxygen concentration and the target oxygen amount adapted for the diffusive combustion based on the running state of the engine, calculate, when the premixed combustion is selected, the target oxygen concentration and the target oxygen amount adapted for the premixed combustion based on the running state of the engine, and control the regulating mechanism to immediately shift the target oxygen concentration and the target oxygen amount to calculated values.

This invention also provides a combustion control method of such an engine that performs combustion of a mixture of a fuel and an aspirated gas and comprises a mechanism for regulating an oxygen concentration of the aspirated gas based on a target oxygen concentration and an oxygen amount of the aspirated gas based on a target oxygen amount.

The method comprises detecting a running state of the engine, selecting any one of a diffusive combustion and a premixed combustion with respect to the combustion of the mixture based on the running state of the engine, calculating, when the diffusive combustion is selected, the target oxygen concentration and the target oxygen amount adapted for the diffusive combustion based on the running state of the engine, calculating, when the premixed combustion is selected, the target oxygen concentration and the target oxygen amount adapted for the premixed combustion based on the running state of the engine, and controlling the regulating mechanism to immediately shift the target oxygen concentration and the target oxygen amount to calculated values.

The details as well as other features and advantages of this invention are set forth in the remainder of the specification and are shown in the accompanying drawings.

BRIEF DESCRIPTION OF THE DRAWINGS

FIGS. 3A–3D are timing charts describing a relation between an EGR valve opening and a fresh air amount, and a relation between a nozzle opening and a fresh air amount.

DESCRIPTION OF THE PREFERRED EMBODIMENTS

Figure 1:
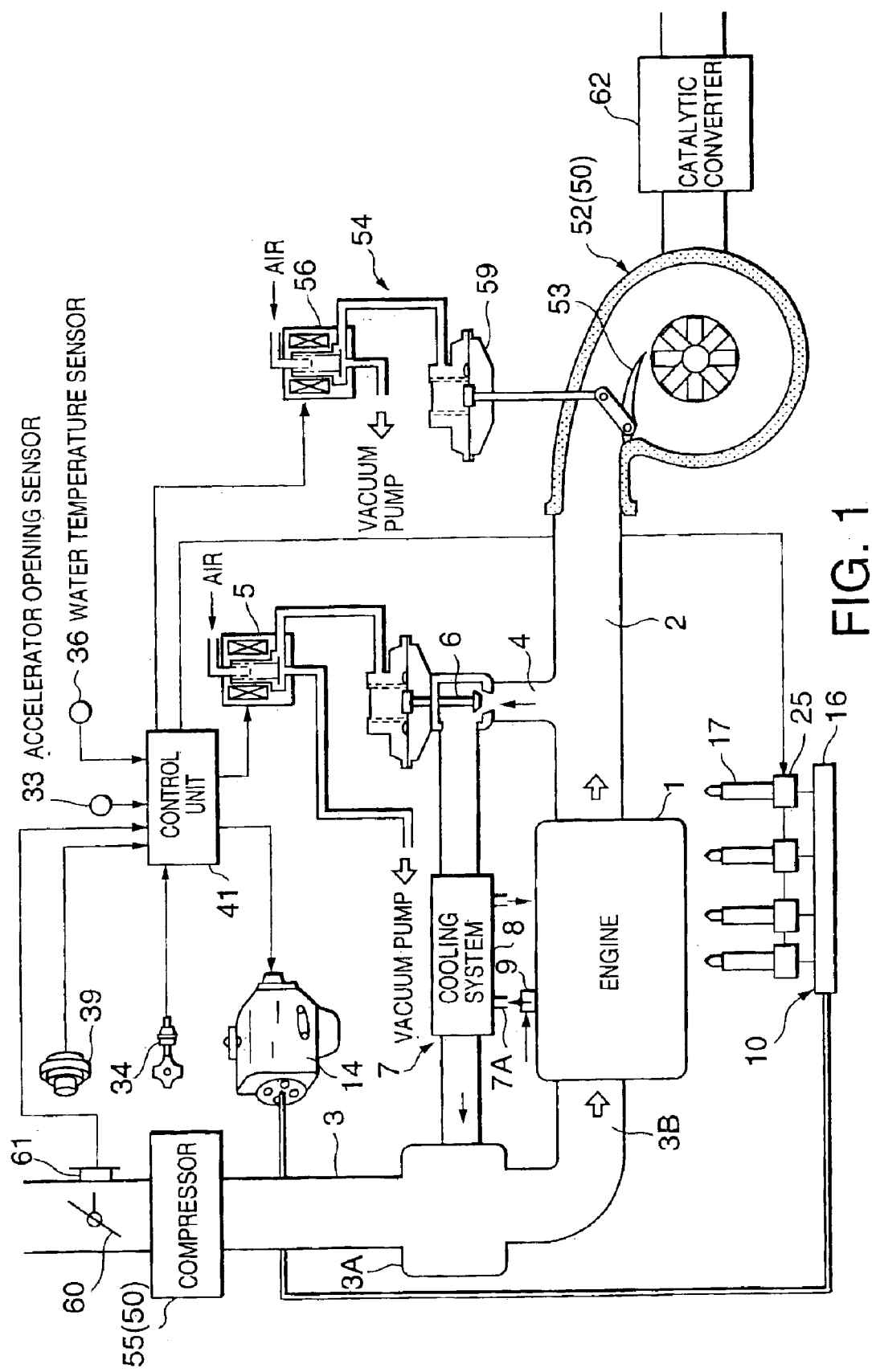
FIG. 1 is a schematic diagram of a combustion control system of a diesel engine according to this invention.

Referring to FIG. 1 of the drawings, a diesel engine 1 is a multi-cylinder diesel engine so constructed that the pattern of heat release is single stage combustion due to performing low temperature premixed combustion. Such a diesel engine is disclosed by Tokkai Hei 8-86251 published by the Japanese Patent Office in 1999.

The diesel engine 1 comprises an intake passage 3 and exhaust passage 2. Intake air of the intake passage 3 is supplied to each cylinder of the diesel engine 1 via a collector 3A and an intake manifold 3B.

A compressor 55 of a turbocharger 50 and an intake throttle 60 driven by a throttle actuator 61 are installed in the intake passage 3 upstream of the collector 3A.

An intake valve and a swirl control valve are provided in an intake port leading from the intake manifold 3B to each cylinder. When the diesel engine 1 is running at low rotation speed on low load, the swirl control valve closes part of the passage and sets up a swirl in the flow of air flowing into the combustion chamber of the diesel engine 1.

The combustion chamber comprises a large diameter toroidal combustion chamber. This is a combustion chamber wherein a cylindrical cavity of the same diameter is formed on a piston. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10. The fuel injection mechanism 10 comprises a common rail 16 connected to a supply pump 14. Nozzles 17 for directly injecting fuel into the respective cylinders are connected to the common rail 16 via solenoid valves 25. The fuel injection amount and injection timing of each nozzle 17 is controlled according to a signal input into the corresponding solenoid valve 25 from a controller 41.

The air aspirated from the intake port and the fuel injected from the nozzle 17 are mixed and combusted in the cylinder. Exhaust gas generated by the combustion of air-fuel mixture is discharged to the exhaust passage 2. The exhaust gas in the exhaust passage 2 drives an exhaust gas turbine 52 of the turbocharger 50, it is discharged into the atmosphere via a catalytic converter 62. The catalytic converter 62 traps nitrogen oxides (NOx) when the diesel engine 1 operates under a lean air-fuel ratio, and reduces the trapped NOx by hydrocarbon (HC) contained in the exhaust gas when the diesel engine 1 operates under a rich air-fuel ratio.

The turbocharger 50 comprises the exhaust gas turbine 52 and the compressor 55 which supercharges the intake fresh air in the intake passage 3 according to the rotation of the exhaust gas turbine 52. The compressor 55 is provided in the middle of the intake passage 3, and the intake passage 3 supplies air compressed by the compressor 55 to the diesel engine 1. A variable nozzle 53 driven by a pressure actuator 54 is provided at an inlet to the exhaust gas turbine 52.

The pressure actuator 54 comprises a diaphragm actuator 59 which drives the variable nozzle 53 according to a signal pressure, and a pressure control valve 56 which generates the signal pressure according to a signal input from the controller 41.

The controller 41 controls the variable nozzle 53 to reduce the nozzle opening when the rotation speed of the diesel engine 1 is low. As a result, the flow velocity of exhaust gas introduced to the exhaust gas turbine 52 is increased so that a predetermined turbocharging pressure is attained. On the other hand, the controller 41 controls the variable nozzle 53 to fully open, when the rotation speed of the diesel engine 1 is high, in order to introduce exhaust gas into the exhaust gas turbine 52 without resistance.

When the air-fuel mixture is burnt in the diesel engine 1, noxious NOx are formed. The NOx amount largely depends on the combustion temperature, and the generation amount of NOx can be suppressed by making the combustion temperature low. This diesel engine 1 reduces the oxygen concentration in the combustion chamber by exhaust gas recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and the collector 3A. The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the controller 41, and thereby varies the rate of exhaust gas recirculation (EGR rate) via the EGR valve 6.

For example, in the low rotation speed, low load range of the diesel engine 1, the EGR rate takes the maximum value. As the rotation speed and load of the diesel engine 1 increase from this state, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve pre-mixture combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the controller 41.

The controller 41 comprises a microcomputer equipped with a central processing unit (CPU), random access memory (RAM), read-only memory (ROM) and input/output interface (I/O interface). The controller 41 may comprise plural microcomputers.

Signals corresponding to detection values are input to the controller 41 from an accelerator opening sensor 33 which detects an opening Cl of a vehicle accelerator pedal, a crank angle sensor 34 which detects a rotation speed Ne and crank angle of the diesel engine 1, a water temperature sensor 36 which detects a cooling water temperature Tw of the diesel engine 1 and an air flow meter 39 which detects an intake fresh air flowrate of the intake passage 3 upstream of the compressor 55. The air flow meter 39 is installed in the intake passage 3 upstream of the intake throttle 60.

Figure 2:
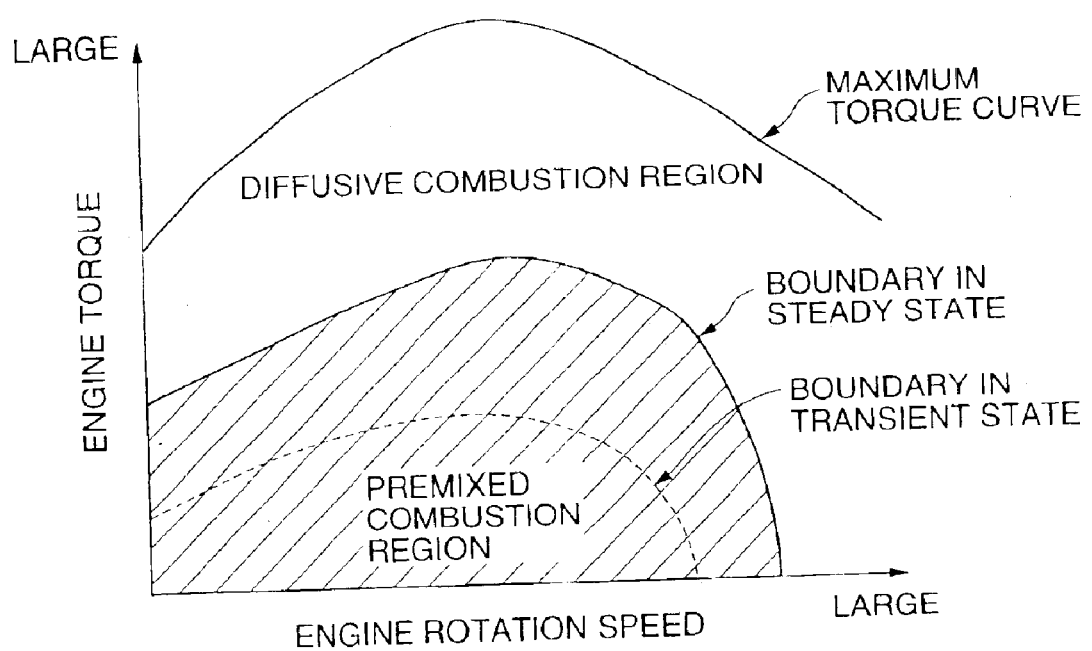
FIG. 2 is a diagram describing combustion regions of the diesel engine.

Next, referring to FIG. 2, the controller 41 makes a diesel engine 1 perform premixed combustion in a running region in which premixed combustion is possible, and makes it perform diffusive combustion in a running region in which premixed combustion is not possible.

Therefore, the optimal target excess air factor and target EGR rate for premixed combustion and diffusive combustion are respectively set according to the running conditions. Here, a target EGR rate represents an oxygen concentration target value of the gas aspirated by the cylinder, and a target EGR amount or target excess air factor represents an oxygen amount target value of the gas aspirated by the cylinder.

Regarding the setting of these target values, the variation in the discharge of NOx and PM in the two aforesaid types of combustion of a diesel engine, which was verified by experiments performed by the Inventor, will be described referring to FIGS. 34A–34D of the drawings. In all these diagrams, the abscissa is the excess air factor, and the ordinate is the EGR rate.

Figure 34A:
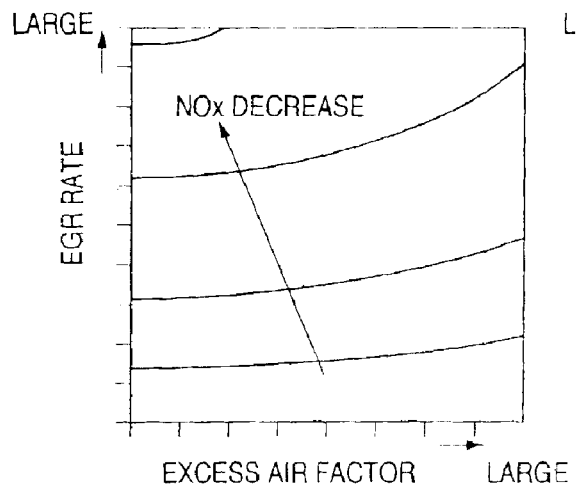
FIGS. 34A–34D are diagrams describing the discharge of NOx and PM in premixed combustion, and the discharge of NOx and PM in diffusive combustion.
Figure 34B:
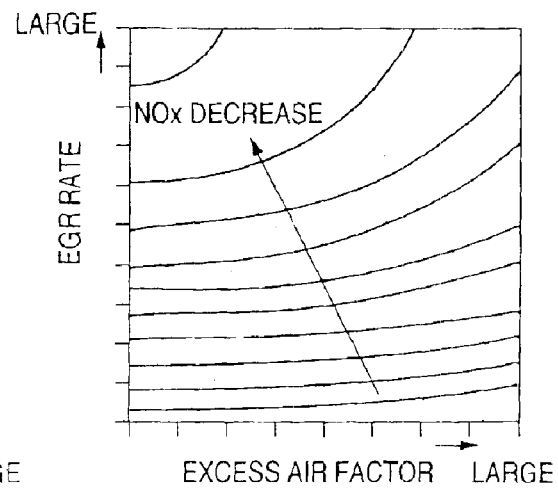

FIGS. 34A and 34B show the difference in NOx discharge during premixed combustion and diffusive combustion. The density of the curves in the diagram shows the magnitude of the variation of NOx discharge.

Figure 34C:
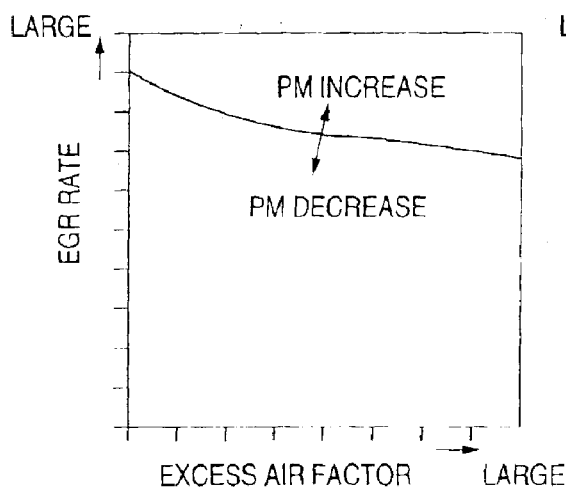
Figure 34D:
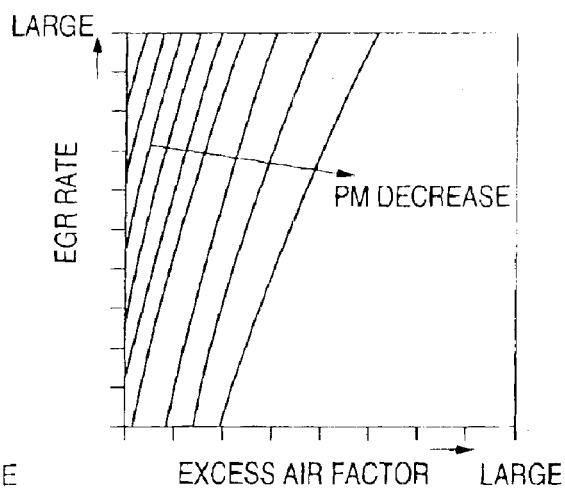

FIGS. 34C and 34D show the difference in PM discharge amount during premixed combustion and diffusive combustion.

As seen from FIG. 34C, during premixed combustion, the difference in EGR rate has a large effect on the PM discharge amount. On the other hand, as seen from FIG. 34D, during diffusive combustion, the difference in excess air factor has a large effect on the PM discharge amount.

Based on the above analysis, it is desirable to control the EGR rate preferentially during premixed combustion, and to control the excess air factor preferentially during diffusive combustion.

The controller 41 determines whether the present running conditions are equivalent to a premixed combustion region, or equivalent to a diffusive combustion region, sets the target excess air factor and target EGR rate according to the determination result, and performs the combustion control based on the set values.

Both the degree of opening of the EGR valve 6 and the degree of opening of the variable nozzle 53 influence the fresh air intake amount. However, as shown in FIGS. 3A–3D, the variation in the intake air amount due to the opening variation of the variable nozzle 53, has a slower response than the variation in the intake fresh air amount due to the opening variation of the EGR valve 6.

In other words, in the transient running state of the diesel engine 1, if it is attempted to control the excess air factor by adjusting the variable nozzle 53 in the state where the excess air factor is preferentially controlled, a large delay appears in the control. Hence, not only in the state where EGR rate is preferentially controlled but also in the state where the excess air factor is preferentially controlled, the control is realized by adjusting the opening of the EGR valve 6.

The details of the aforesaid control performed by the controller 41 will now be described referring to the flowcharts of FIG. 5, FIG. 7, FIG. 10, FIGS. 13–17, FIG. 20, FIG. 21, FIGS. 24–26, and the block diagram of FIG. 4.

Figure 4:
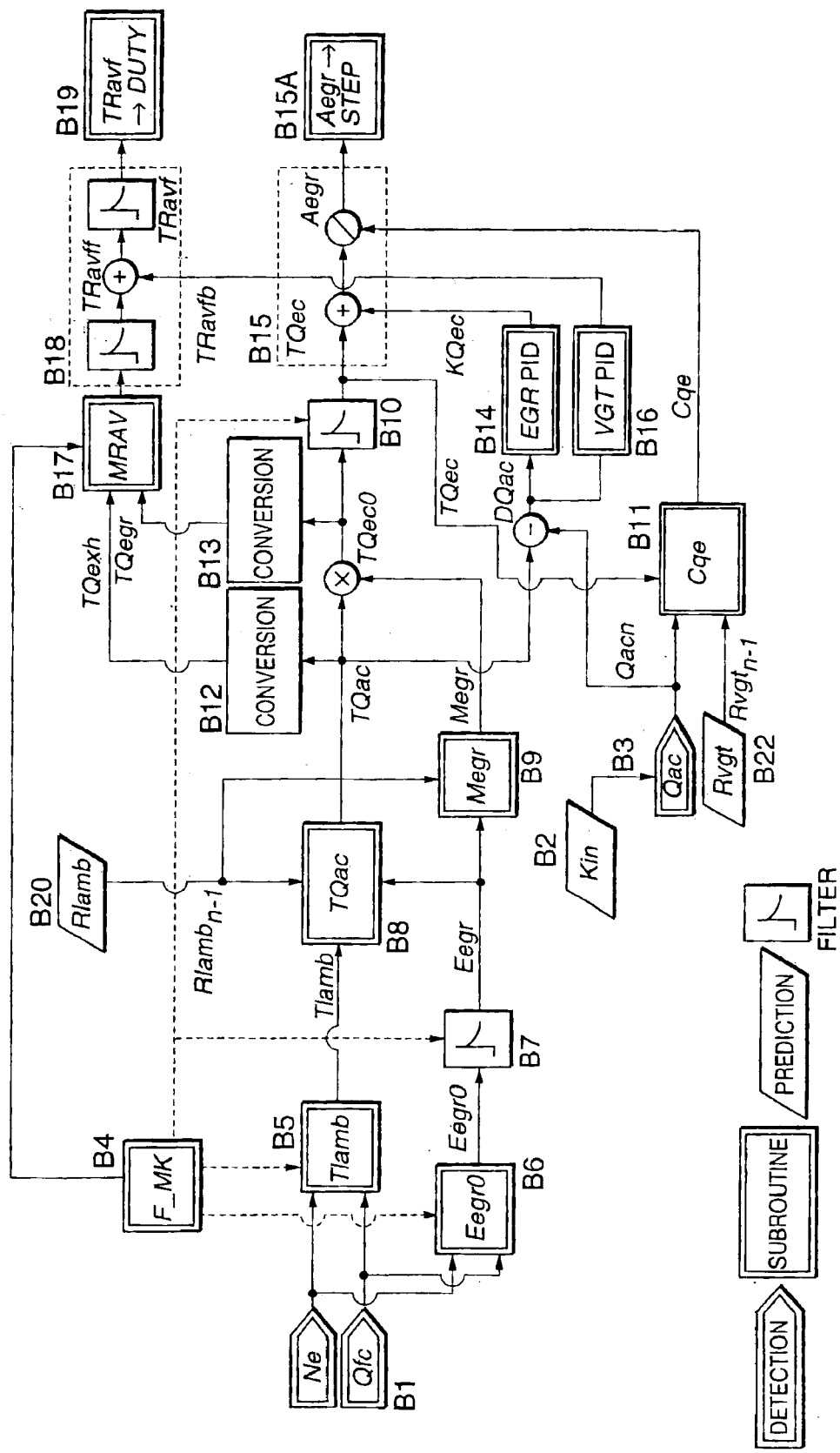
FIG. 4 is a block diagram describing the function of a programmable controller with which the combustion control system is provided.

FIG. 4 is a diagram which summarizes the processing of these flowcharts. Blocks B1 to B22 shown in this diagram represent various functions as virtual units. These units do not physically exist. The block numbers B1–B22 show the sequence of processing steps.

Figure 5:
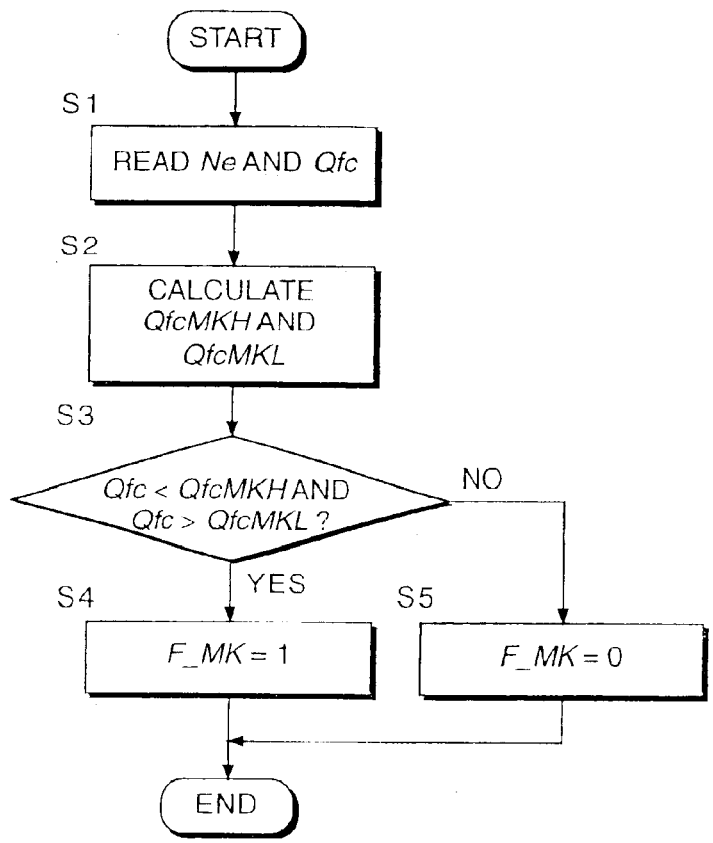
FIG. 5 is a flowchart describing a premixed combustion flag setting routine performed by the controller.

First, referring to FIG. 5, a routine for setting a premixed combustion flag F_MK will be described.

This routine, which corresponds to the functions of the blocks B1, B4 in FIG. 4, is repetitively performed in synchronism with the rotation of the diesel engine 1.

First, in a step S1, the controller 41 reads the rotation speed Ne detected by the crank angle sensor 34 and a target fuel injection amount Qfc of the diesel engine 1.

The target fuel injection amount Qfc is calculated by looking up a map having the accelerator pedal opening Cl and the rotation speed Ne as parameters.

Figure 6:
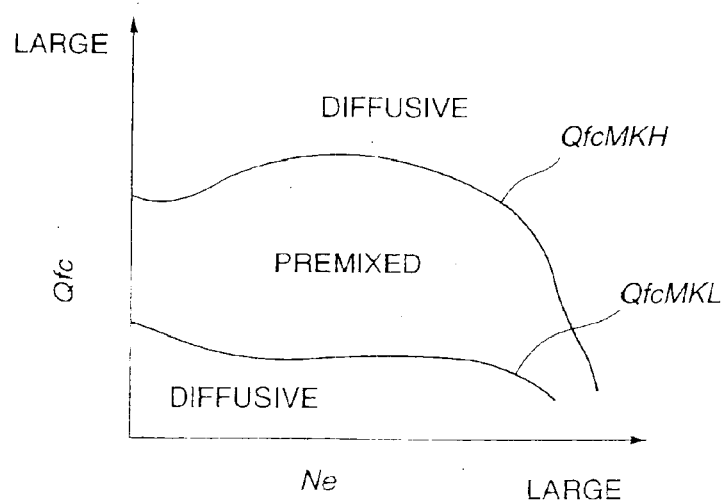
FIG. 6 is a diagram describing the characteristics of a combustion region determining map stored by the controller.

In a next step S2, a map of the characteristics shown in FIG. 6 is looked up based on the engine rotation speed Ne, and an upper limit fuel injection amount QfcMKH of the premixed combustion region and a lower limit fuel injection amount QfcMKL relative to the engine rotation speed Ne are determined. This map is stored beforehand in the controller 41.

In a following step S3, it is determined whether or not the target fuel injection amount Qfc lies within a premixed combustion region specified by the upper limit fuel injection amount QfcMKH and the lower limit fuel injection amount QfcMKL.

When the target fuel injection amount Qfc lies within the premixed combustion region, the controller 41 terminates the routine, after setting a premixed combustion flag F_MK to unity in a step S4.

On the other hand, when the target fuel injection amount Qfc does not lie within the premixed combustion region, the controller 41 terminates the routine, after resetting the premixed combustion flag F_MK to zero in a step S5.

Figure 7:
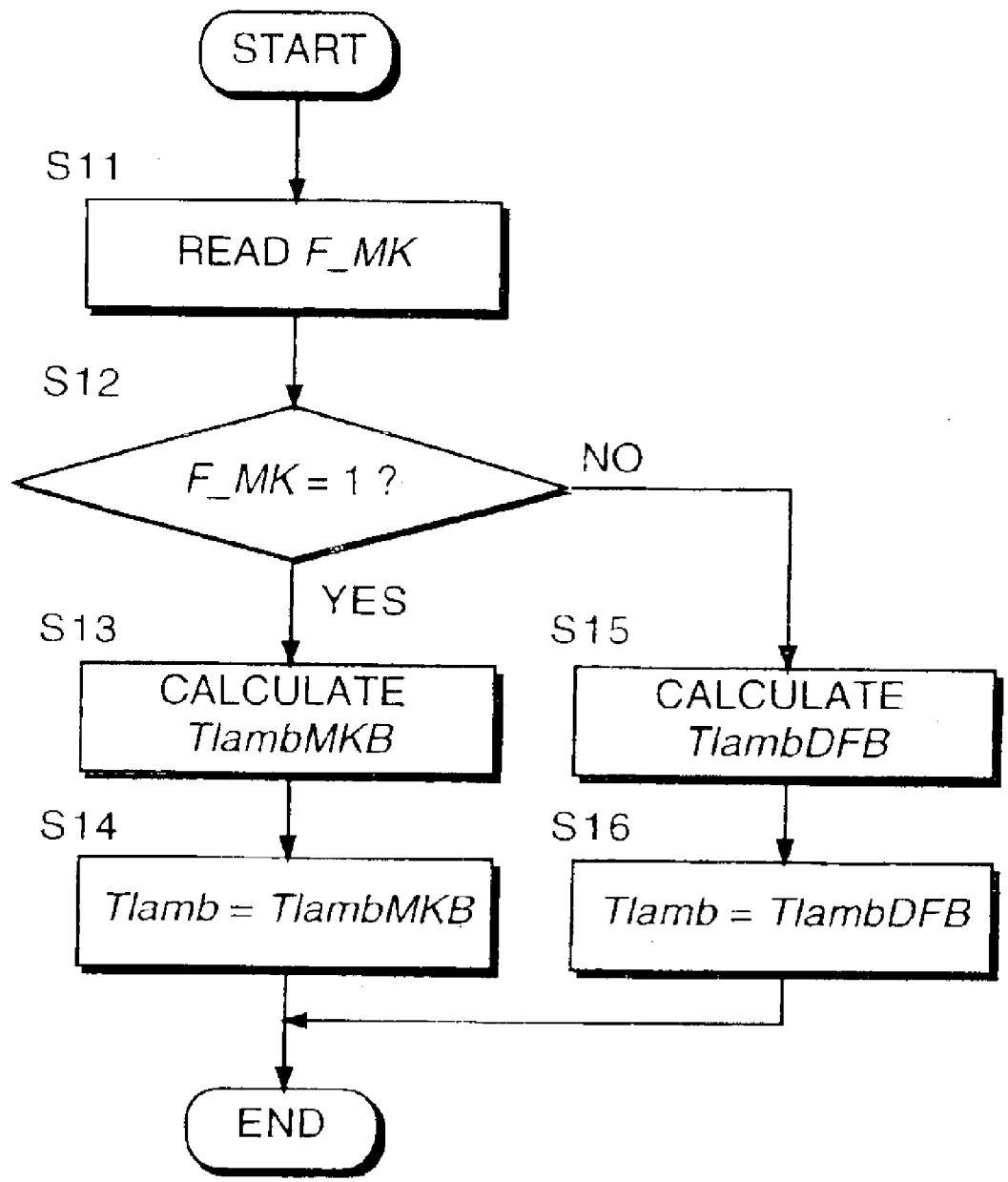
FIG. 7 is a flowchart describing a routine for calculating a target excess air factor Tlamb performed by the controller.

Next, referring to FIG. 7, a routine for calculating a target excess air factor Tlamb will be described.

This routine, which corresponds to a block B5 of FIG. 4, is repetitively performed in synchronism with the rotation of the diesel engine 1.

First, in a step S11, the controller 41 reads the premixed combustion flag F_MK.

In a next step S12, it is determined whether or not the premixed combustion flag F_MK is unity. As is clear from the routine of FIG. 5, the premixed combustion flag F_MK takes the value of either unity or zero.

Figure 8:
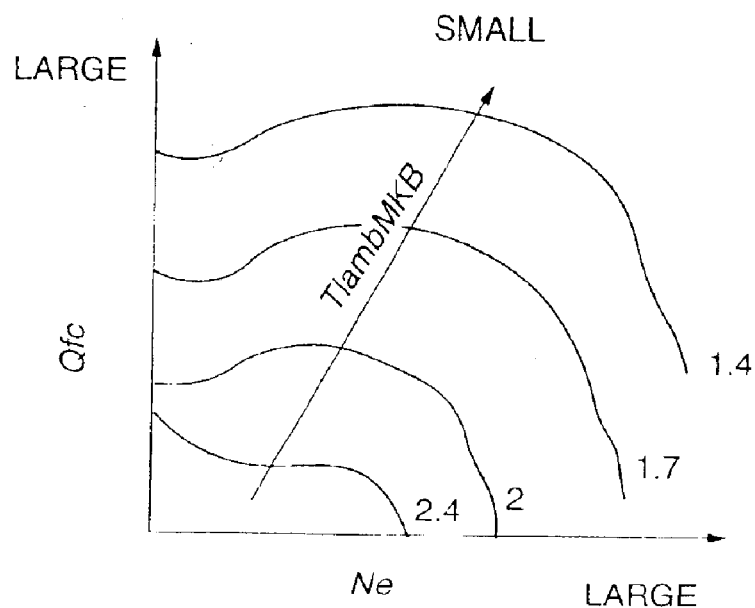
FIG. 8 is a diagram describing the characteristics of a target excess air factor map for premixed combustion stored by the controller.

When the premixed combustion flag F_MK is unity, in a step S13, the controller 41 looks up a map which has the features shown in FIG. 8 from the engine rotation speed Ne and the target fuel injection amount Qfc, and calculates a target excess air factor TlambMKB for premixed combustion. This map is set beforehand by experiment and is stored in the controller 41.

In a following step S14, the target excess air factor Tlamb is set equal to the target excess air factor TlambMKB for premixed combustion, and the routine is then terminated.

Figure 9:
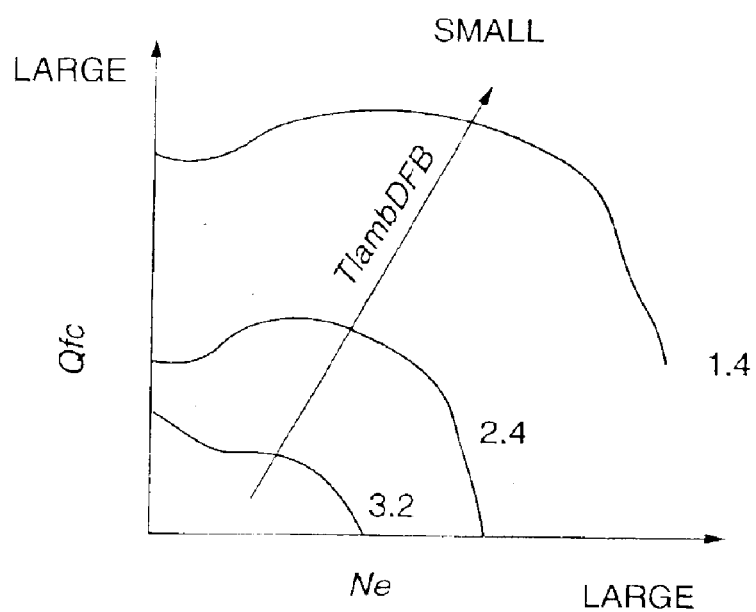
FIG. 9 is a diagram describing the characteristics of a target excess air factor map for diffusive combustion stored by the controller.

When the flag F_MK is not unity in the step S13, in a step S15, the controller 41 looks up a map which has the features shown in FIG. 9 from the engine rotation speed Ne and the target fuel injection amount Qfc, and calculates a target excess air factor TlambDFB for diffusive combustion. This map is also stored beforehand in the controller 41.

In a following step S16, the target excess air factor Tlamb is set equal to the target excess air factor TlambDFB for diffusive combustion, and the routine is then terminated.

Here, comparing FIGS. 8 and 9, the target excess air factor TlambMKB for premixed combustion will be set to a value smaller than the target excess air factor TlambDFB for diffusive combustion. The target excess air factor which these maps give is set to a value which takes account of the oxygen in the recirculated exhaust gas by EGR.

Figure 10:
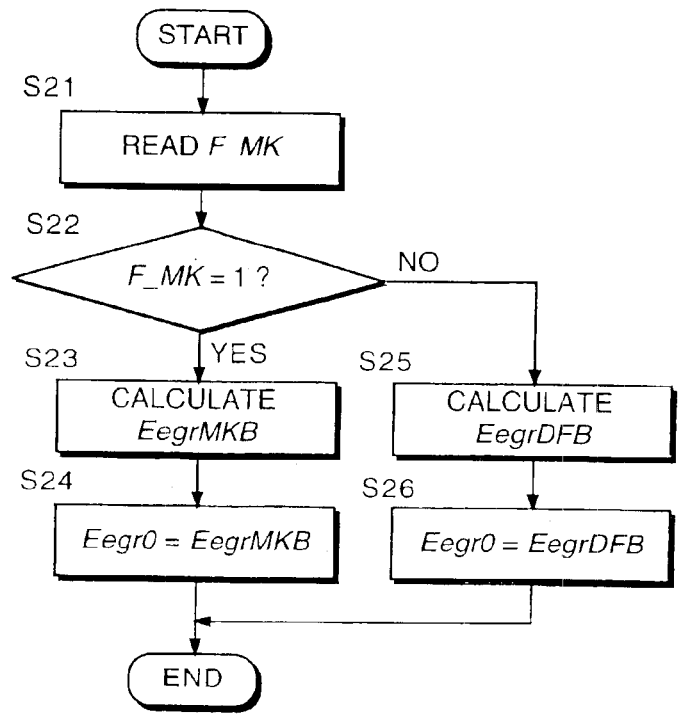
FIG. 10 is a flowchart describing a routine for calculating a target effective EGR rate basic value Eegr0 performed by the controller.

Next, referring to FIG. 10, a routine for calculating a target effective EGR rate basic value Eegr0 will be described.

This routine, which corresponds to the function of the block B6 of FIG. 4, is repetitively performed in synchronism with the rotation of the diesel engine 1.

First, in a step S21, the controller 41 reads the premixed combustion flag F_MK.

In a following step S22, it is determined whether or not the flag F_MK is unity.

Figure 11:
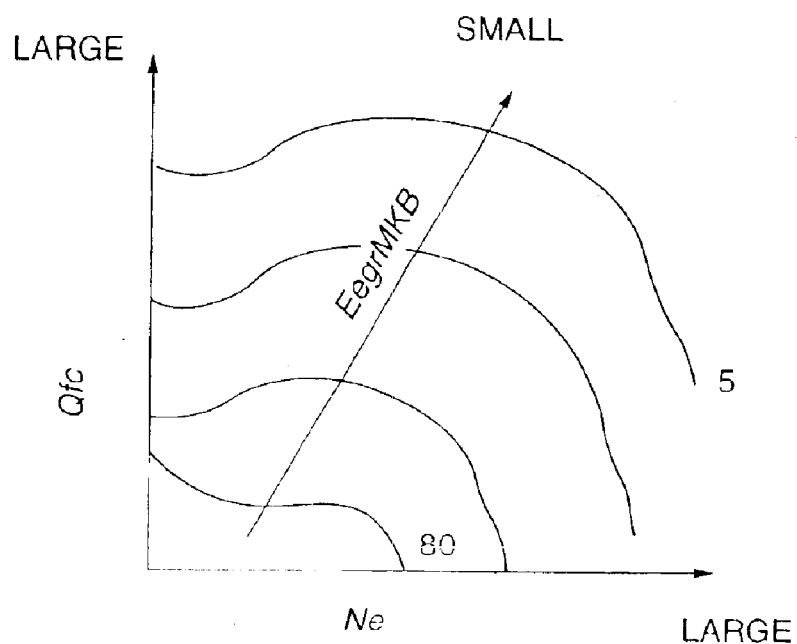
FIG. 11 is a diagram describing the characteristics of a target effective EGR rate basic value map for premixed combustion stored by the controller.

When the flag F_MK is unity, in a step S23, the controller 41 looks up the map having the characteristics shown in FIG. 11 from the engine rotation speed Ne and the target fuel injection amount Qfc, and calculates the target effective EGR rate EegrMKB for premixed combustion.

This map is set beforehand by experiment and is stored in the controller 41.

In a following step S24, the target effective EGR rate basic value Eegr0 is set equal to the target effective EGR rate EegrMKB for premixed combustion, and the routine is then terminated.

Figure 12:
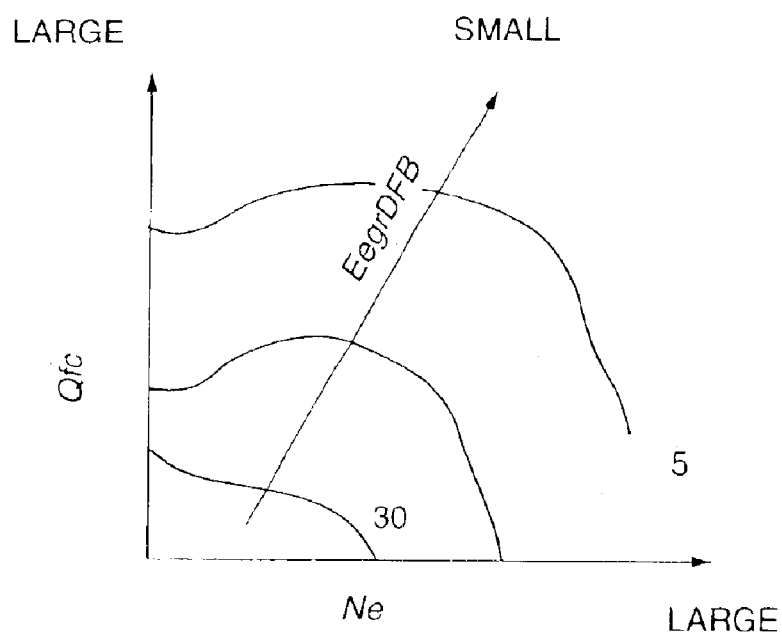
FIG. 12 is a diagram describing the characteristics of a target effective EGR rate basic value map for diffusive combustion stored by the controller.

On the other hand, when the premixed combustion flag F_MK is not unity in the step S22, in a step S25, the controller 41 looks up the map of the characteristics shown in FIG. 12 from the engine rotation speed Ne and the target fuel injection amount Qfc, and calculates the target effective EGR rate EegrDFB for diffusive combustion.

This map is set beforehand by experiment and is stored in the controller 41.

In a following step S26, the target effective EGR rate basic value Eegr0 is set equal to the target effective EGR rate EegrDFB for diffusive combustion, and the routine is then terminated.

The target effective EGR rates EegrMKB, EegrDFB are values which take account of the oxygen contained in the recirculated exhaust gas, and are expressed by the ratio of the mass of the recirculated exhaust gas excluding oxygen and the mass of the gas aspirated by the cylinder.

Here, comparing FIGS. 11 and 12, the target effective EGR rate EegrMKB for premixed combustion will be set to a larger value than the target effective EGR rate EegrDFB for diffusive combustion. This difference reflects which of the excess air factor and EGR rate shall be preferentially controlled. That is, since the EGR rate is preferentially controlled during premixed combustion, the target effective EGR rate EegrMKB is set as the optimum value. On the other hand, during diffusive combustion, the excess air factor is controlled preferentially. In order to make the excess air factor coincide with the target value in a short time, it is necessary to change the EGR rate to the original target value with some overshoot. The characteristics of the map of target effective EGR rates EegrMKB, EegrDFB are set in consideration of such a difference.

Next, referring to FIG. 13, a routine for calculating a target effective EGR rate Eegr will be described.

This routine, which corresponds to the function of the block B7 of FIG. 4, is repetitively performed in synchronism with the rotation of the diesel engine 1.

First, in a step S31, the controller 41 reads the premixed combustion flag F_MK.

In a following step S32, it is determined whether or not the flag F_MK is unity.

When the premixed combustion flag F_MK is unity, in a step S33, the controller 41 calculates a weighted average efficiency Eegrd by the following equation (1).

$$Eegrd = Eegr0 \cdot Kin \cdot Kvol + Eegrd_{n-1} \cdot (1 - Kin \cdot Kvol) \quad (1)$$

where, Kin=volume efficiency equivalent value,
Kvol=(VE/NC)/VM,
VE=discharge amount of diesel engine 1,
NC=number of cylinders of diesel engine 1,
VM=volume of intake passage from collector 3A to intake valve, and
$Eegrd_{n-1}$=weighted average value Eegrd on immediately preceding occasion when routine was performed.

The volume efficiency equivalent value Kin is calculated by the block B2 of FIG. 4.

The calculation of the volume efficiency equivalent value Kin is known by U.S. Pat. No. 6,019,094, the disclosure of which is herein incorporated by reference.

In the next step S34, the target effective EGR rate Eegr is calculated by adding a delay correction to the weighted average efficiency Eegrd, by the following equation (2).

$$Eegr = Gkeegr \cdot Eegr0 - (Gkeegr - 1) \cdot Eegrd \quad (2)$$

where, Gkeegr=delay correction gain.

After calculating the target effective EGR rate Eegr in the step S34, the controller 41 terminates the routine.

On the other hand, when the premixed combustion flag F_MK is not unity in the step S32, in a step 35, the controller 41 sets the target effective EGR rate Eegr equal to the target effective EGR rate basic value Eegr0, and terminates the routine.

The target effective EGR rate Eegr calculated by this routine for premixed combustion is a value incorporating a delay correction, and the target effective EGR rate Eegr calculated by this routine for diffusive combustion is a value to which a delay correction is not added.

Figure 14:
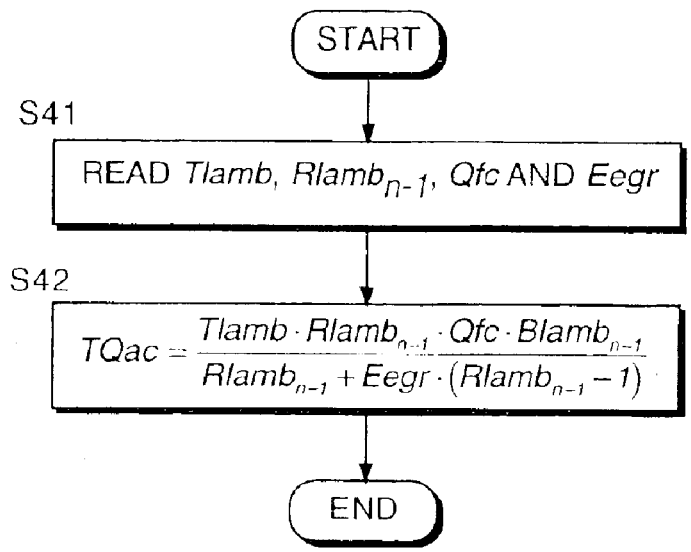
FIG. 14 is a flowchart describing a routine for calculating a target fresh air amount TQac performed by the controller.

Next, referring to FIG. 14, a routine for calculating a target fresh air amount TQac will be described.

This routine, which corresponds to the function of the block B8, is repetitively performed in synchronism with the rotation of the diesel engine 1.

First, in a step S41, the controller 41 reads the target excess air factor Tlamb, an excess air factor $Rlamb_{n-1}$ in the cylinder, the target fuel injection amount Qfc and the target effective EGR rate Eegr. The excess air factor $Rlamb_{n-1}$ in the cylinder is calculated by the routine of FIG. 24, described later. The routine of FIG. 24 corresponds to the block B20 of FIG. 4, and is performed after the execution of the routine of FIG. 14.

Figure 24:
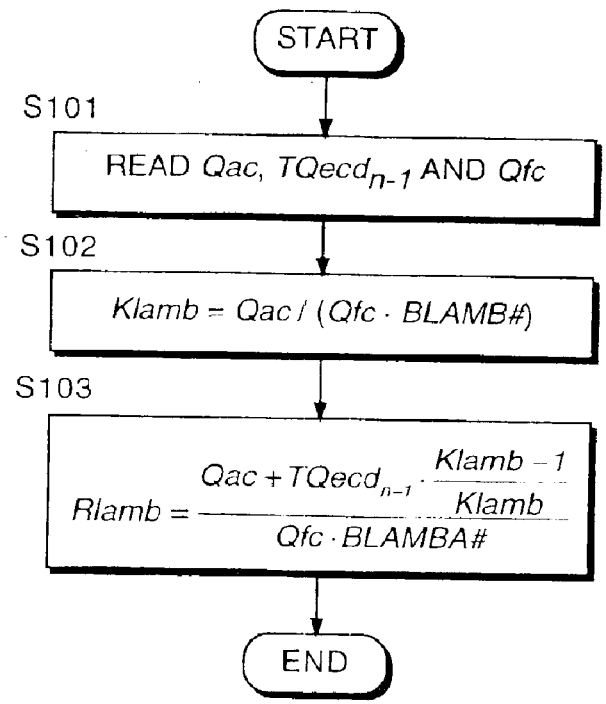
FIG. 24 is a flowchart describing a routine for calculating an excess air factor Rlamb in a cylinder performed by the controller.

The n-1 in the excess air factor $Rlamb_{n-1}$ in the cylinder means the value calculated by the execution of the routine of FIG. 24 on the immediately preceding occasion.

In a following step S42, the target fresh air amount TQac is calculated by the following equation (3).

$$TQac = \frac{Tlamb \cdot Rlamb_{n-1} \cdot Qfc \cdot Blamb_{n-1}}{Rlamb_{n-1} + Eegr \cdot (Rlamb_{n-1} - 1)} \quad (3)$$

where, Blamb=stoichiometric air-fuel ratio.

Equation (3) is an equation deduced from the following equation (4).

$$\text{Effective excess air factor} = \frac{\left\{\frac{Qac + Qec \cdot (Rlamb_{n-1} - 1)}{Rlamb_{n-1}}\right\}}{Qfc \cdot Blamb} \quad (4)$$

where, Qac=the intake fresh air amount per cylinder, and Qec=EGR amount=Qac·Eegr.

When the excess air factor is larger than unity, a part of the fresh air aspirated by the cylinder is mixed with the exhaust gas, and is discharged.

$(Rlamb_{n-1}-1)/Rlamb_{n-1}$ shows the proportion of fresh air in the recirculated exhaust gas.

If the effective excess air factor of equation (4) is substituted by the target excess air factor Tlamb and the equation is solved for the intake fresh air amount Qac, equation (3) for the target intake fresh air amount TQac will be obtained.

After calculating the target fresh air amount TQac in the step S42, the controller 41 terminates the routine.

Figure 13:
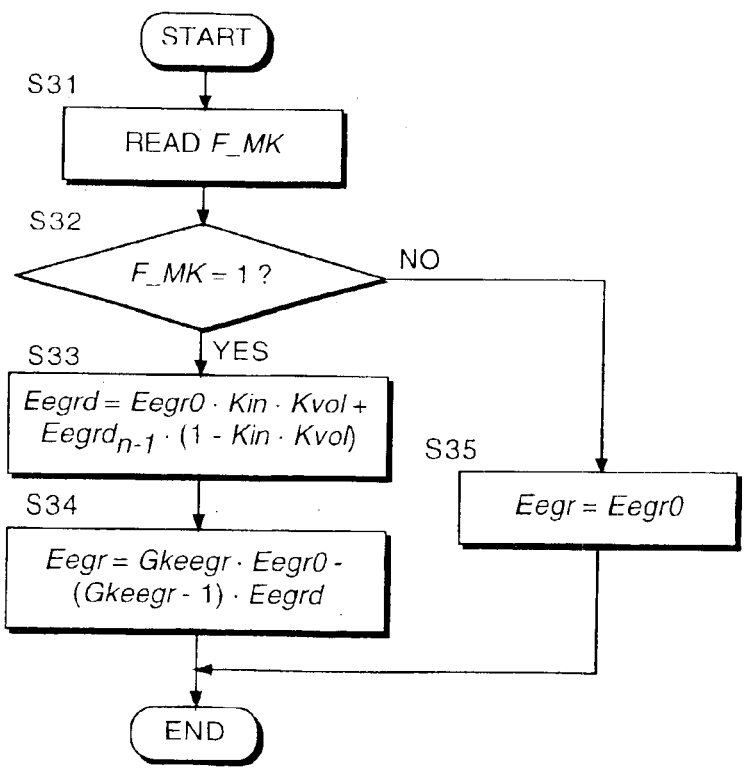
FIG. 13 is a flowchart describing a routine for calculating a target effective EGR rate Eegr performed by the controller.

By this routine, the target fresh air amount TQac is calculated using the target effective EGR rate Eegr calculated by the routine of FIG. 13. Therefore, the target fresh air amount TQac calculated during premixed combustion is a value to which a delay correction is added, and the target fresh air amount TQac calculated during diffusive combustion is a value to which a delay correction is not added.

Figure 15:
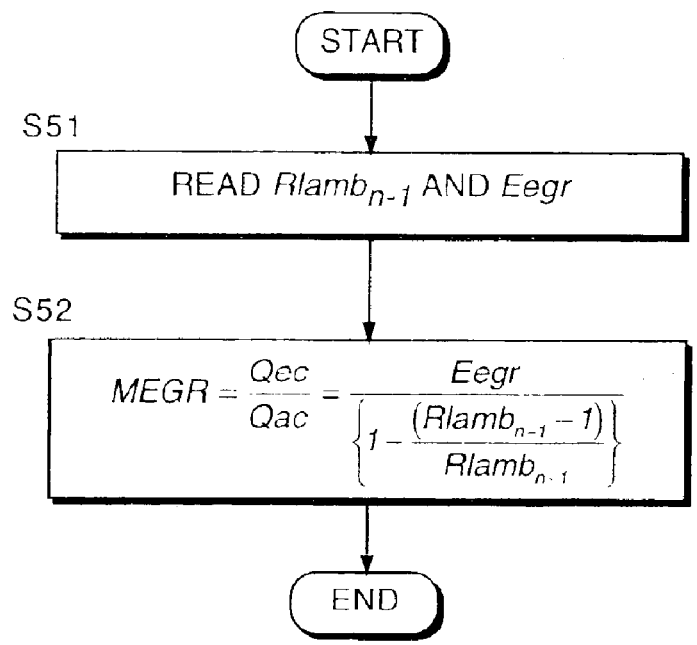
FIG. 15 is a flowchart describing a routine for calculating a target mass EGR rate Megr performed by the controller.

Next, referring to FIG. 15, a routine for calculating a target mass EGR rate Megr will be described.

This routine, which corresponds to the function of the block B9 of FIG. 4, is repetitively performed in synchronism with the rotation of the diesel engine 1.

First, in a step S51, the controller 41 reads the excess air factor $Rlamb_{n-1}$ in the cylinder and the target effective EGR rate Eegr. The excess air factor $Rlamb_{n-1}$ in the cylinder is a value calculated by execution of the routine of FIG. 24 on the immediately preceding occasion, as mentioned above.

In a following step S52, the target mass EGR rate Megr is calculated by the following equation (5).

$$MEGR = \frac{Qec}{Qac} = \frac{Eegr}{\left\{1 - \frac{(Rlamb_{n-1} - 1)}{Rlamb_{n-1}}\right\}} \quad (5)$$

Equation (5) is an equation deduced from the following equation (6) relating to the effective EGR rate of the gas aspirated by the cylinder.

$$\text{Effective EGR rate} = \frac{Qec \cdot \left(1 - \frac{Rlamb_{n-1} - 1}{Rlamb_{n-1}}\right)}{Qac} \quad (6)$$

$$\left(1 - \frac{Rlamb_{n-1} - 1}{Rlamb_{n-1}}\right)$$

in equation (6) shows the proportion of inert gas contained in the recirculated exhaust gas.

Equation (5) is obtained if an equation in which the effective EGR rate of equation (6) is replaced by the target effective EGR rate Eegr, and Megr=Qec/Qac, are solved as simultaneous equations.

After calculating the target mass EGR rate Megr in the step S52, the controller 41 terminates the routine.

Figure 16:
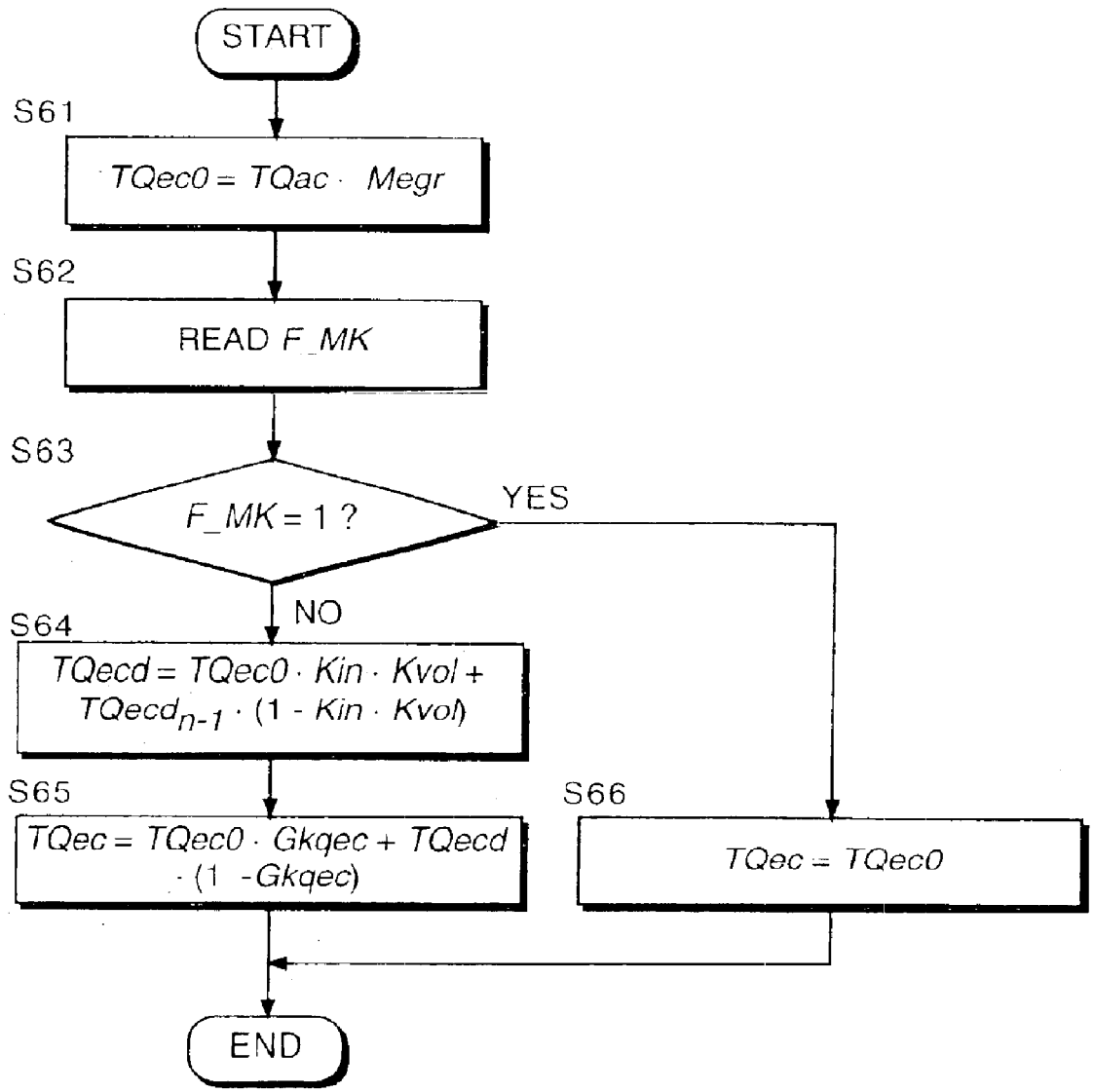
FIG. 16 is a flowchart describing a routine for calculating a target EGR amount TQac performed by the controller.

Next, referring to FIG. 16, a routine for calculating a target EGR amount TQec will be described.

This routine, which corresponds to the function of the block B10 of FIG. 4, is repetitively performed in synchronism with rotation of a diesel engine 1.

First, in a step S61, the controller 41 calculates a target EGR amount basic value TQec0 by the following equation (7).

$$TQec0 = TQac \cdot Megr \quad (7)$$

In a next step S62, the premixed combustion flag F_MK is read.

In a following step S63, it is determined whether or not the premixed combustion flag F_MK is unity.

When the premixed combustion flag F_MK is not unity, in a step S64, the controller 41 calculates a weighted average value TQecd by the following equation (8).

$$TQecd = TQec0 \cdot Kin \cdot Kvol + TQecd_{n-1} \cdot (1 - Kin \cdot Kvol) \quad (8)$$

where, $TQecd_{n-1}$=weighted average value TQecd calculated on the immediately preceding occasion when the routine was executed.

In a following step S65, the target EGR amount TQec is calculated by adding a delay correction by the following equation (9) to the weighted average value TQecd.

$$TQec = TQec0 \cdot Gkqec + TQecd \cdot (1 - Gkqec) \tag{9}$$

where, Gkqec=delay correction gain.

Equation (8) and (9) are obtained by applying the concept of equations (1) and (2) for calculating the target effective EGR rate Eegr, to the calculation of the target EGR amount TQec.

After calculating the target EGR amount TQec in the step S65, the controller 41 terminates the routine.

On the other hand, when the premixed combustion flag F_MK is unity in the step S63, the controller 41 terminates the routine after setting the target EGR amount TQec equal to the target EGR amount basic value TQec0 in a step S66.

The target EGR amount TQec calculated by this routine for diffusive combustion is a value to which a delay correction is added, and the target EGR amount TQec calculated by this routine for the premixed combustion is a value to which a delay correction is not added.

However, the target mass EGR rate Megr used for the calculation of the target EGR amount basic value TQec0 is calculated based on the target effective EGR rate Eegr calculated in the above-mentioned routine of FIG. 13. Consequently, the target EGR amount basic value TQec0 for premixed combustion is calculated based on the target effective EGR rate Eegr to which a delay correction is added, and the target EGR amount basic value TQec0 for diffusive combustion is calculated based on the target effective EGR rate Eegr to which a delay correction is not added.

However, a delay correction gain Gkqec applied to the calculation of the target EGR amount TQec is set to a larger value than a delay correction gain Gkeegr applied to the calculation of the target effective EGR rate Eegr.

Consequently, the delay correction added to the target EGR amount TQec for diffusive combustion is larger than the delay correction added to the target EGR amount TQec for premixed combustion. The reason why the target mass EGR rate Megr to which a delay correction is added, is used for calculation of the target EGR amount TQec for premixed combustion, is because the EGR amount becomes excessive during acceleration due to the delay in operating the EGR valve 6 and the delay in the pressure variation upstream and downstream of the EGR valve 6, and this is to prevent the excess air factor from falling too much.

Next, referring to FIG. 17, a routine for calculating a recirculated exhaust gas flow velocity equivalent value Cqe will be described.

This routine, which corresponds to the function of the block B11 of FIG. 4, is performed at an interval of ten milliseconds during running of the diesel engine 1.

Theoretically, the EGR flowrate can be calculated by the following equation (10) using the intake pressure Pm of the diesel engine 1, exhaust gas pressure Pexh, specific gravity ρ of the exhaust gas, and opening cross-sectional area Ave of the EGR valve.

$$Cqe = \sqrt{2 \cdot \rho \cdot (Pexh - Pm)} \tag{10}$$

However, as it is difficult to measure the exhaust gas pressure Pexh correctly, the EGR flowrate is estimated approximately here.

First, in a step S71, the controller 41 reads the target EGR amount TQec, a collector inlet fresh air amount Qacn and a real nozzle opening $Rvgt_{n-1}$.

The collector inlet fresh air amount Qacn is the fresh air amount at the inlet 3A, and is calculated by the block B3 of FIG. 4.

The calculation of the collector inlet fresh air amount Qacn is disclosed by the above-mentioned U.S. Pat. No. 6,019,094, and its description will therefore be omitted.

The real nozzle opening $Rvgt_{n-1}$ is calculated by the routine of FIG. 25 below.

Figure 17:
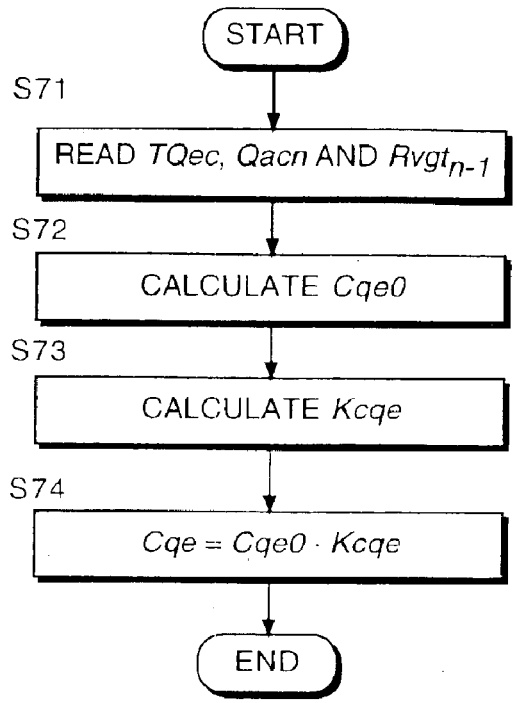
FIG. 17 is a flowchart describing a routine for calculating a recirculated exhaust gas flow velocity equivalent value Cqe performed by the controller.
Figure 25:
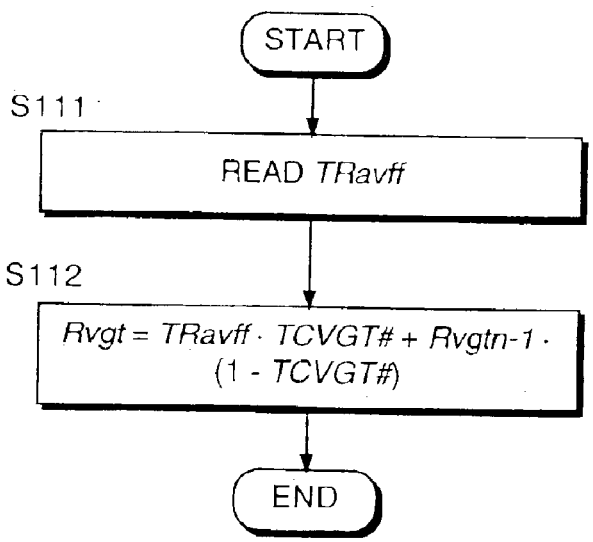
FIG. 25 is a flowchart describing a routine for calculating a real nozzle opening Rvgt performed by the controller.

The routine of FIG. 25 corresponds to the block B22 of FIG. 4, and is performed after the routine of FIG. 17.

n−1 assigned to the real nozzle opening $Rvgt_{n-1}$ means that this is a value of Rvgt calculated by the routine of FIG. 25 on the immediately preceding occasion.

Figure 18:
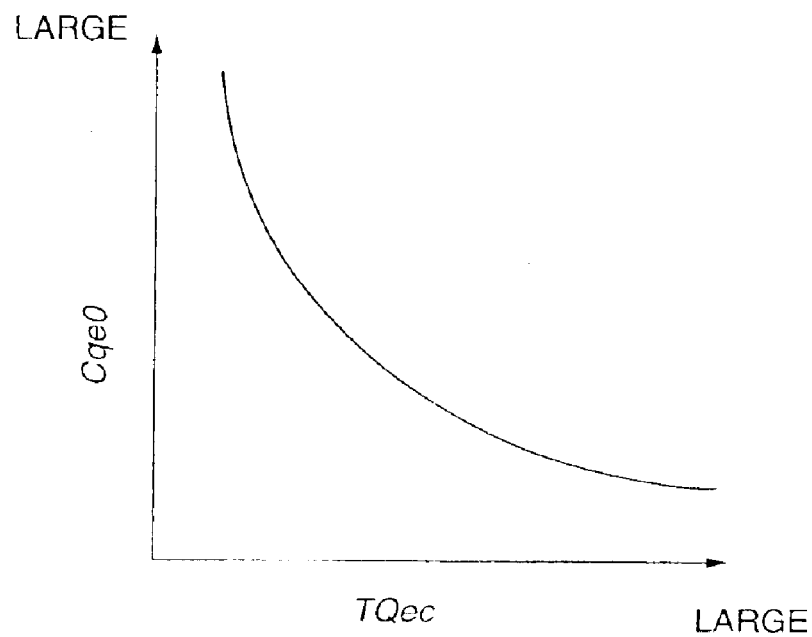
FIG. 18 is a diagram describing the characteristics of a recirculated exhaust gas flowrate basic value map stored by the controller.

In a following step S72, a map which has the characteristics shown in FIG. 18 is looked up from the target EGR amount TQec, and the flow velocity basic value Cqe0 is calculated. This map is set beforehand by experiment and is stored in the controller 41.

Figure 19:
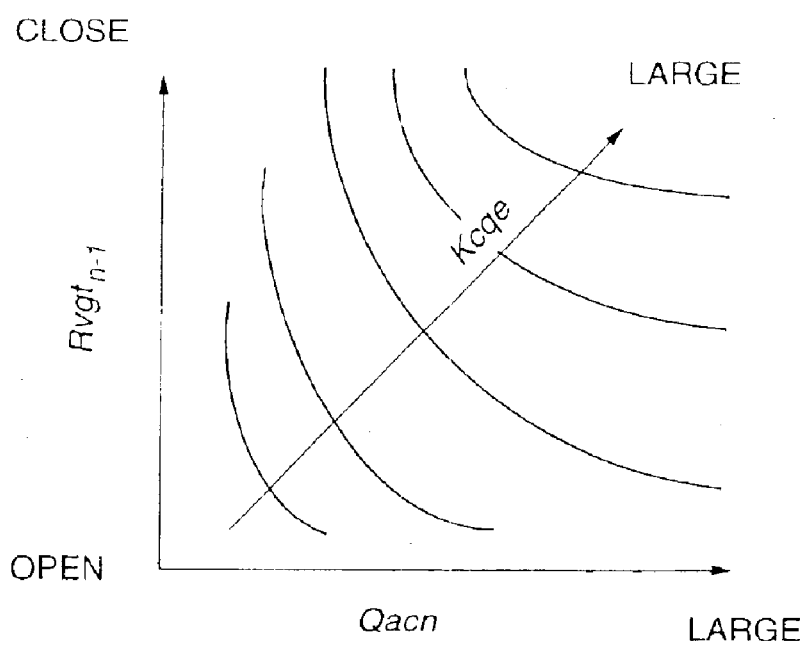
FIG. 19 is a diagram describing the characteristics of a flowrate correction value map stored by the controller.

In a following step S73, the controller 41 looks up a map which has the characteristics shown in FIG. 19 from the collector inlet fresh air amount Qacn and the real nozzle opening $Rvgt_{n-1}$, and calculates the recirculated exhaust gas flowrate correction factor Kcqe. The recirculated exhaust gas flowrate correction factor Kcqe is a value showing the effect which the discharge amount and real nozzle opening Rvgt have on the recirculated exhaust gas flowrate. Here, the discharge amount is substantially equal to the collector inlet fresh air amount Qacn.

The map of FIG. 19 is also set beforehand by experiment and is stored in the controller 41.

In a the following step S73, the controller 41 multiplies the flow velocity basic value Cqe0 by the recirculated exhaust gas flow velocity correction factor Kcqe to calculate the recirculated exhaust gas flow velocity equivalent value Cqe. After calculation of the recirculated exhaust gas flow velocity equivalent value Cqe, the controller 41 terminates the routine.

Figure 29:
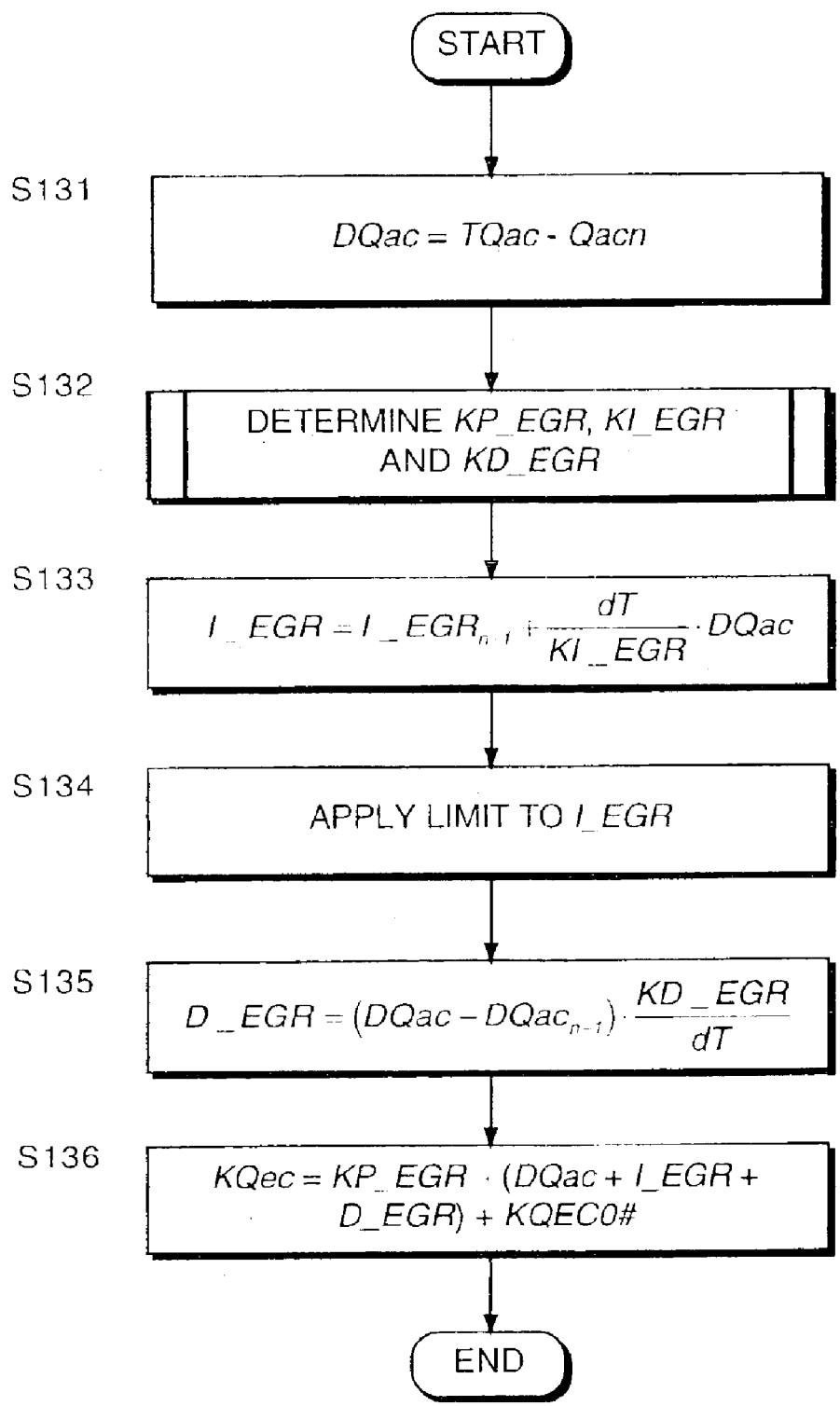
FIG. 29 is a flowchart describing a routine for calculating an EGR amount feedback correction amount KQec performed by the controller.

Next, referring to FIG. 29, a routine for calculating a feedback correction amount KQec of the EGR amount will be described.

This routine corresponds to the function of the block B14 in FIG. 4, and is performed at an interval of ten milliseconds during running of the diesel engine 1.

The well-known proportional/integral/derivative control (PID control) is applied to feedback control of the target EGR amount. The basic algorithm of PID control is expressed by the following equation (11).

$$u(t) = KP \cdot \left[ e(t) + \frac{1}{KI} \cdot \int e(t)dt + KD \cdot \frac{d\{e(t)\}}{dt} \right] + u(t0) \tag{11}$$

where, u(t)=correction amount,
KP=proportional gain,
e(t)=deviation,
KP·1/KI=integral gain,
KI=integral time constant,
KP·KD=differential gain,
KD=differential time constant, and
u(t0)=initial value.

In this routine, each component of equation (11) is defined as follows.

$KP = KP\_EGR$ $\frac{1}{KI} \cdot \int e(t)dt = I\_EGR$ $KI = KI\_EGR$

-continued $$KD \cdot \frac{d\{e(t)\}}{dt} = D\_EGR$$

$$KD = KD\_EGR$$

First, in a step S131, the controller 41 calculates a deviation DQac between the target fresh air amount TQac and the collector inlet fresh air amount Qacn.

In a following step S132, the proportional gain KP_EGR, integral time constant KI_EGR and differential time constant KD_EGR for PID control are set referring to a predetermined map, respectively.

Figure 30:
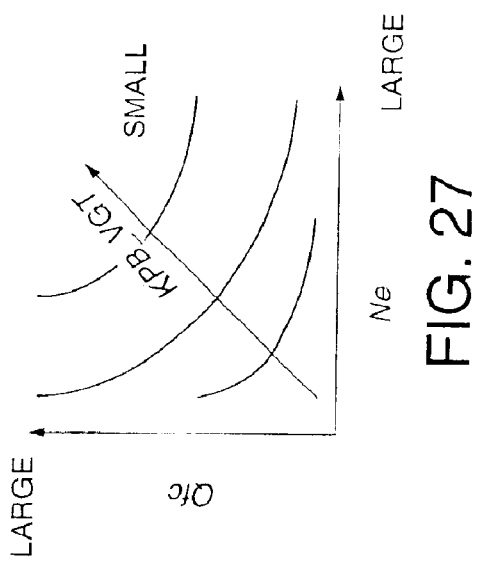
FIG. 30 is a diagram describing the characteristics of a map of a proportional gain basic value KPB_EGR stored by the controller.
Figure 31:
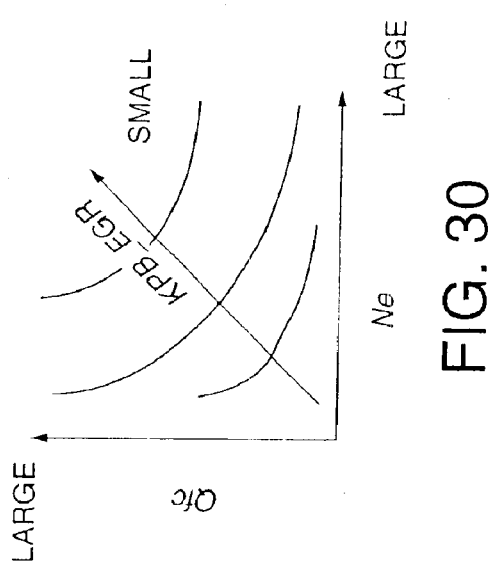
FIG. 31 is a diagram describing the characteristics of a map of a water temperature correction factor KPW_EGR stored by the controller.

FIGS. 30 and 31 show an example of the map for calculating the proportional gain KP_EGR.

The controller 41 looks up a map of the characteristics shown in FIG. 30 based on the engine rotation speed Ne and target fuel injection amount Qfc, and calculates the proportional gain basic value KPB_EGR.

Next, a map of the characteristics shown in FIG. 31 is looked up based on the engine cooling water temperature Tw, and the water temperature correction factor KPW_EGR is calculated. The proportional gain KP_EGR is calculated by multiplying the proportional gain basic value KPB_EGR by the water temperature correction factor KPW_EGR.

These maps are set beforehand by experiment and are stored in the controller 41.

The integral time constant KI_EGR and differential time constant KD_EGR are also computed by multiplying the basic value and water temperature correction factor found by looking up the maps stored in the controller 41.

In a next step S133, the controller 41 calculates I_EGR by the following equation (12).

$$I\_EGR = I\_EGR_{n-1} + \frac{dT}{KI\_EGR} \cdot DQac \quad (12)$$

where, $I\_EGR_{n-1}$=I_EGR calculated by the routine executed on the immediately preceding occasion.

In a following step S134, a predetermined limitation processing is performed on I_VGT.

In a following step S135, D_EGR is calculated by the following equation (13).

$$D\_EGR = (DQac - DQac_{n-1}) \cdot \frac{KD\_EGR}{dT} \quad (13)$$

where, $Dqac_{n-1}$=deviation DOac calculated by the routine executed on the immediately preceding occasion.

In a following step S136, the feedback correction amount KQec of the EGR amount is calculated by the following equation (14).

$$KQec = KP\_EGR \cdot (DQac + I\_EGR + D\_EGR) + KQEC0\# \quad (14),$$

where, KQEC0#=initial value=0.

After this calculation, the controller 41 terminates the routine.

Figure 20:
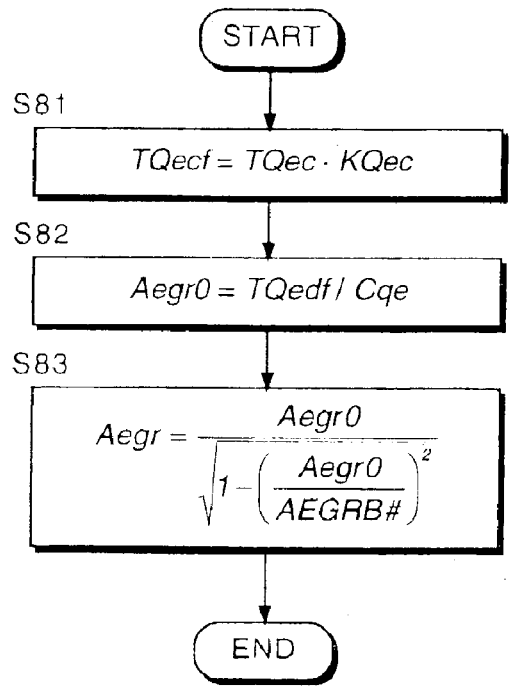
FIG. 20 is a flowchart describing a routine for calculating an EGR valve opening area Aegr performed by the controller.

Next, referring to FIG. 20, a routine for calculating a target EGR valve opening area Aegr will be described.

This routine corresponds to the function of the block B15 in FIG. 4, and is performed at an interval of ten milliseconds during the running of the diesel engine 1.

First, in a step S81, the controller 41 adds the feedback correction amount KQec to the target EGR amount TQec to calculate a final target EGR amount TQecf.

Here, the final target EGR amount TQecf is a mass flowrate.

In a following step S82, the target EGR valve opening area basic value Aegr0 is calculated by dividing the target final EGR amount TQecf by the recirculated exhaust gas flow velocity equivalent value Cqe.

In a following step S83, the target EGR valve opening area Aegr is calculated by the following equation (15) from the target EGR valve opening area basic value Aegr0. Equation (15) is an equation based on the Venturi model.

$$Aegr = \frac{Aegr0}{\sqrt{1 - \left(\frac{Aegr0}{AEGRB\#}\right)^2}} \quad (15)$$

where, AEGRB#=representative cross-section area of the EGR passage 4.

The controller 41 outputs a signal corresponding to the target EGR valve opening area Aegr calculated in this way to the negative pressure control valve 5 in the block B15A of FIG. 4.

After the calculation of the step S83, the controller 41 terminates the routine.

Figure 21:
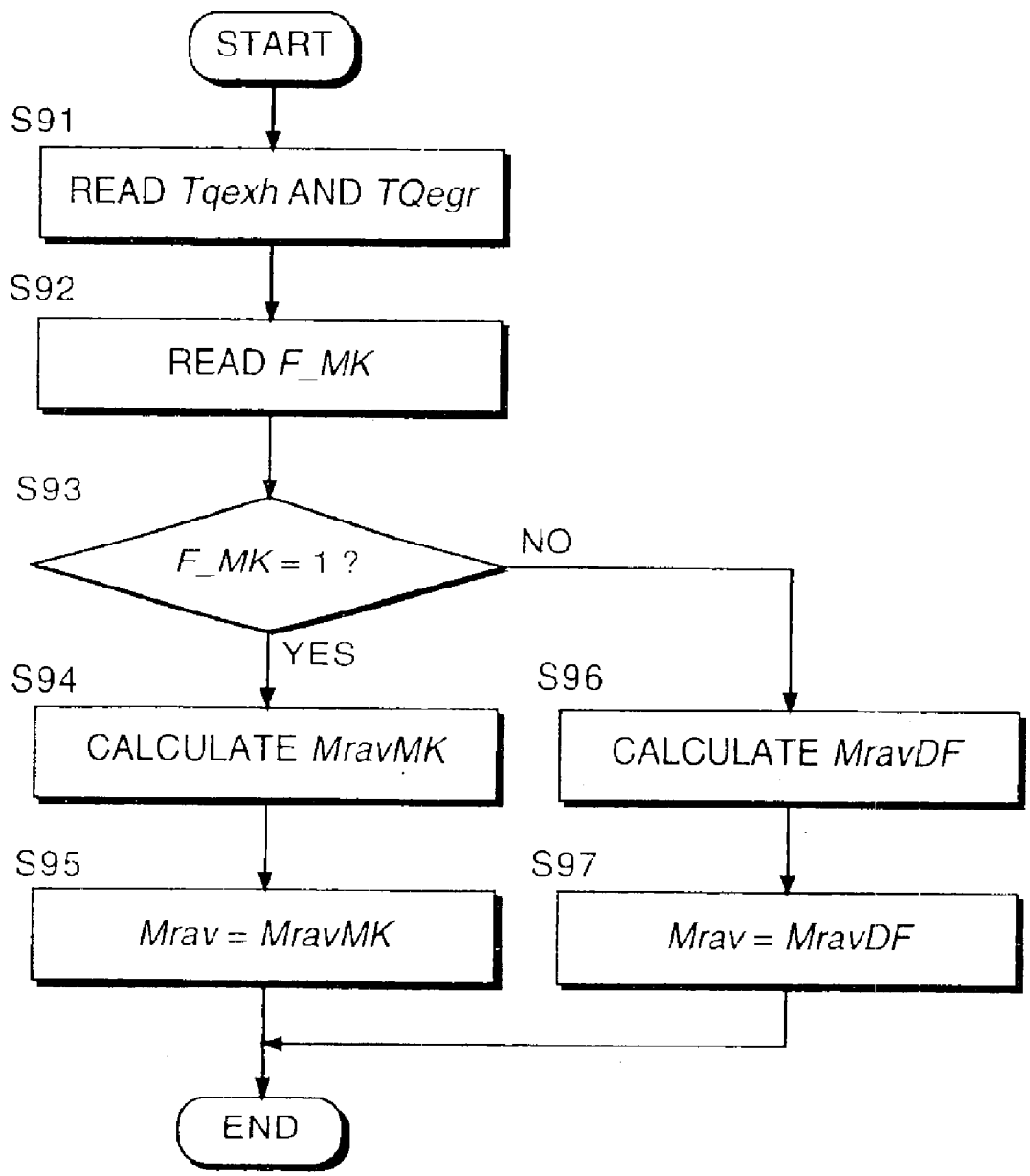
FIG. 21 is a flowchart describing a routine for calculating a target nozzle opening Mrav performed by the controller.

Next, referring to FIG. 21, a routine for calculating a target nozzle opening Mrav of the variable nozzle 53 will be described.

This routine corresponds to the function of the block B17 in FIG. 4, and is performed at an interval of ten milliseconds during running of the diesel engine 1.

First, in a step S91, the controller 41 reads a target exhaust gas flowrate TQexh and target EGR flowrate TQegr.

The target exhaust gas flowrate TQexh is obtained by performing unit conversion on the target fresh air amount TQac in the block B12 of FIG. 4. The target EGR flowrate TQegr is obtained by performing unit conversion on the target EGR basic value TQec0 in the block B13 of FIG. 4.

In a following step S92, the controller 41 reads the premixed combustion flag F_MK, and in a next step S93, determines whether or not the premixed combustion flag F_MK is unity.

Figure 22:
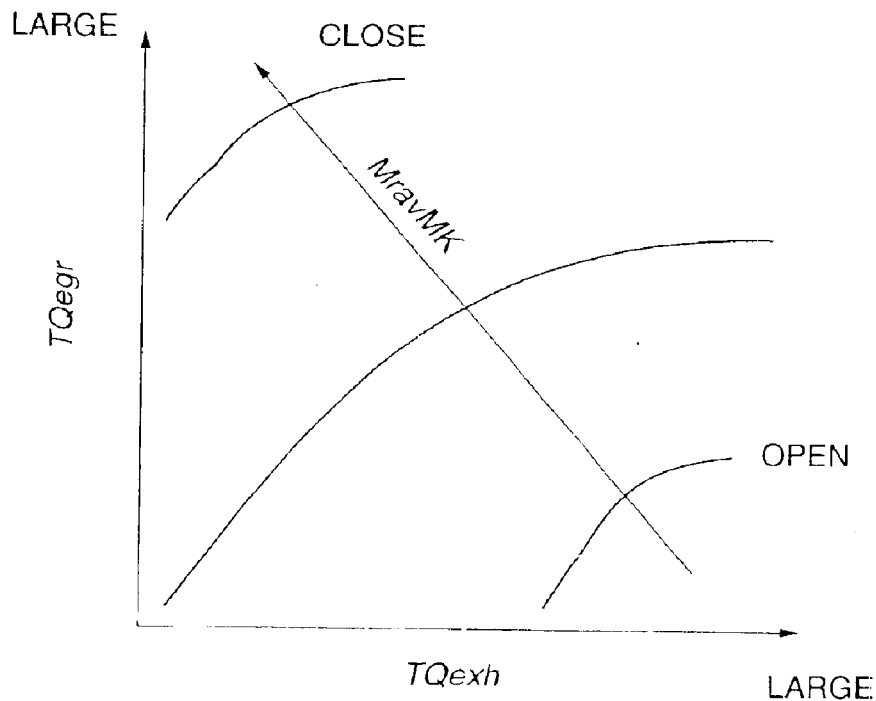
FIG. 22 is a diagram describing the characteristics of a target nozzle opening map for premixed combustion stored by the controller.
Figure 23:
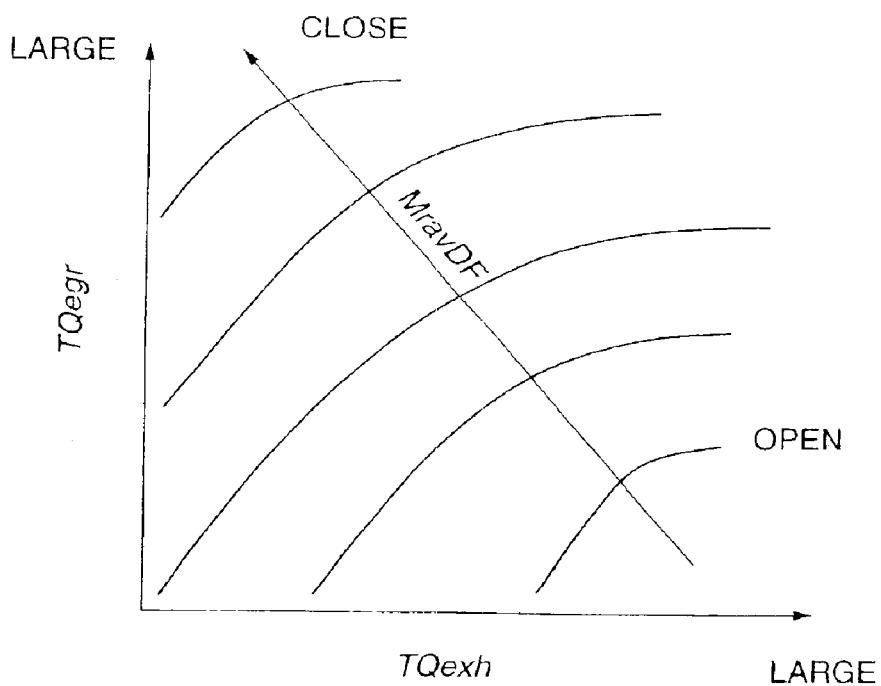
FIG. 23 is a diagram describing the characteristics of the target nozzle opening map for diffusive combustion stored by the controller.

When the premixed combustion flag F_MK is unity, in a step S94, the controller 41 looks up a map which has the characteristics shown in FIG. 22 from the target exhaust gas flowrate TQexh, and the target EGR flowrate TQegr, and calculates the target nozzle opening MravMK for premixed combustion. This map has the object of optimizing the excess air factor and EGR rate for premixed combustion, is set beforehand by experiment and is stored in the controller 41.

In a following step S95, the target nozzle opening Mrav is set equal to the target nozzle opening MravMK for premixed combustion. After the processing of the step S95, the controller 41 terminates the routine.

On the other hand, when the premixed combustion flag F_MK is not unity in the step S93, in a step S96, the controller 41 looks up a map which has the characteristics shown in FIG. 22 from the target exhaust gas flowrate TQexh and the target EGR flowrate TQegr, and calculates a target nozzle opening MravDF for diffusive combustion. This map has the objective of optimizing the excess air factor and EGR rate for diffusive combustion, is set beforehand by experiment and is stored in the controller 41.

In a following step S97, the target nozzle opening Mrav is set equal to the target nozzle opening MravDF for diffusive combustion. After the processing of the step S97, the controller 41 terminates the routine.

In the control of the variable nozzle 53, the response until the intake air amount varies from the opening variation of the variable nozzle 53 is affected by the response delay of the gas flow including the rotation response delay of the exhaust gas turbine 52 or compressor 55, and the response delay of the diaphragm actuator 59 which drives the variable nozzle 53. The response delay of the diaphragm actuator 59 is constant irrespective of the running condition of the diesel engine 1.

In the block B18 of FIG. 4, an open-loop correction is separately performed to compensate for the above two kinds of response delay having different characteristics. In the block B18, a first corrected target nozzle opening TRavff is first calculated by adding a delay correction related to the response delay of the gas flow to the target nozzle opening Mrav.

On the other hand, in the block B16, a nozzle opening feedback correction amount TRavfb is calculated based on the deviation DQac between the target fresh air amount TQac and the collector inlet fresh air amount Qacn by applying the PID control method.

Figure 26:
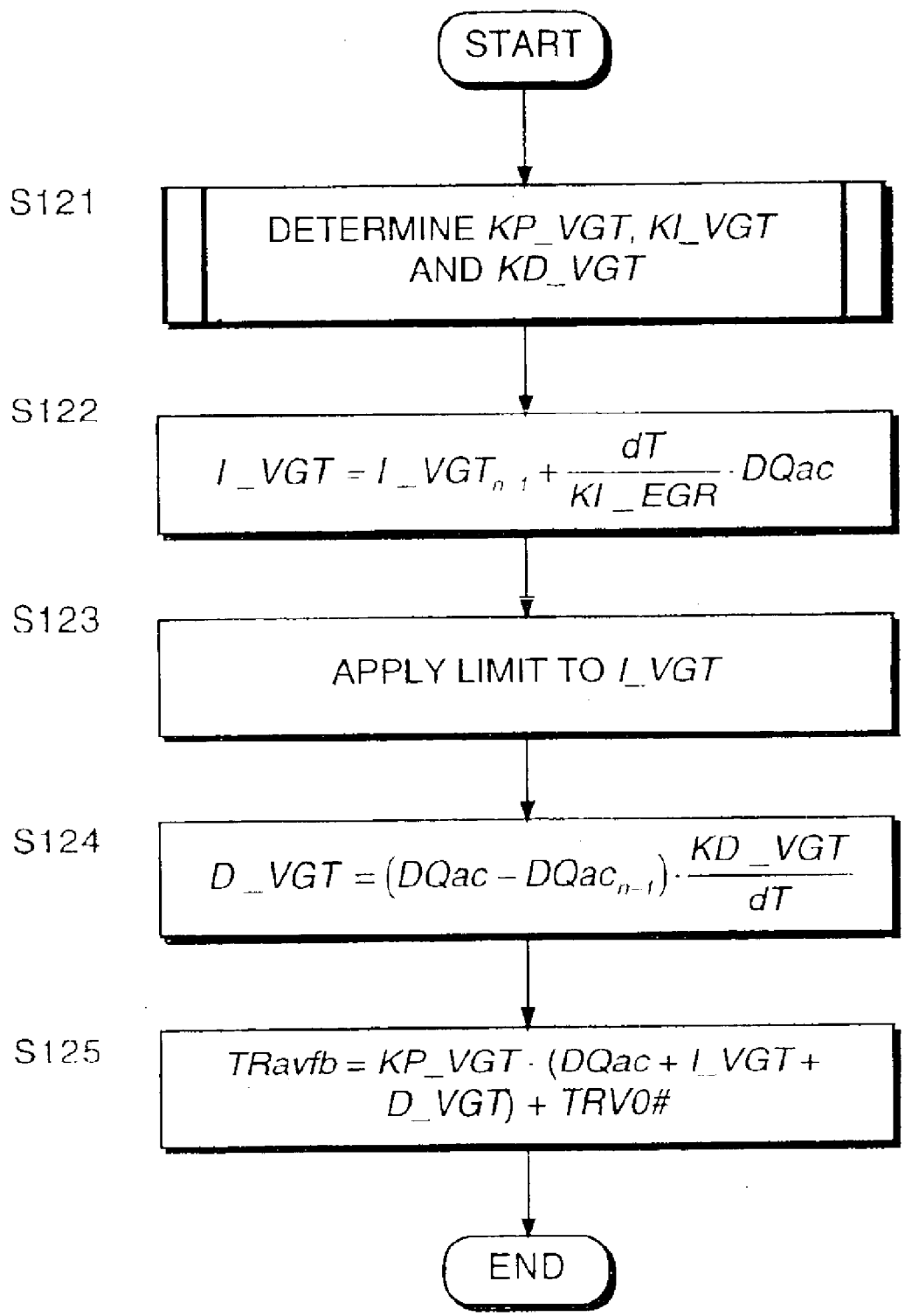
FIG. 26 is a flowchart describing a routine for calculating a nozzle opening feedback correction amount TRavfb performed by the controller.

FIG. 26 shows this calculation routine. This routine is repetitively performed at an interval of ten milliseconds during the running of the diesel engine 1.

The basic algorithm of PID control is expressed by the aforesaid equation (11).

In this routine, each component of equation (11) is set as follows.

$$KP = KP\_VGT$$

$$\frac{1}{KI} \cdot \int e(t)dt = I\_VGT$$

$$KI = KI\_VGT$$

$$KD \cdot \frac{d\{e(t)\}}{dt} = D\_VGT$$

$$KD = KD\_VGT$$

First, in a step S121, the controller 41 sets KP_VGT, KI_VGT, KD_VGT referring to a predetermined map, respectively.

Figure 27:
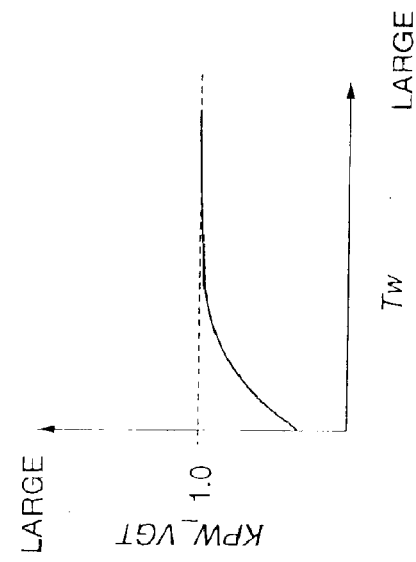
FIG. 27 is a diagram describing the characteristics of a map of a proportional gain basic value KPB_VGT stored by the controller.
Figure 28:
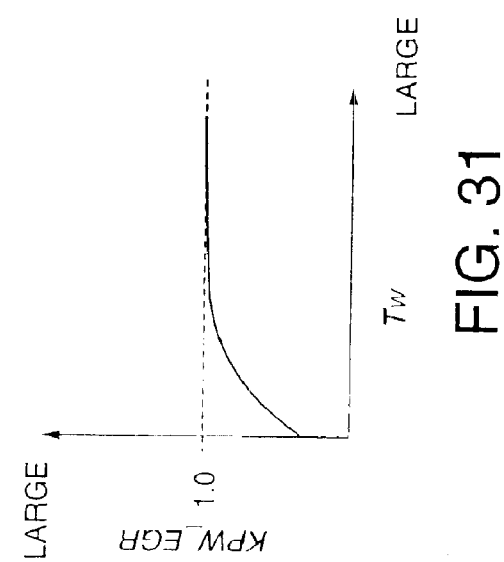
FIG. 28 is a diagram describing the characteristics of a map of a water temperature correction factor KPW_VGT stored by the controller.

FIGS. 27, 28 show examples of the map for calculating the proportional gain KP_VGT. The controller 41 looks up the map of the characteristics shown in FIG. 27 based on the engine rotation speed Ne and the target fuel injection amount Qfc, and calculates a proportional gain basic value KPB_VGT.

Next, a map having the characteristics shown in FIG. 28 is looked up based on the engine cooling water temperature Tw, and the water temperature correction factor KPW_VGT is calculated. The proportional gain KP_VGT is calculated by multiplying the proportional gain basic value KPB_VGT by the water temperature correction factor KPW_VGT. These maps are set beforehand by experiment and are stored in the controller 41.

Also, an integral time constant KI_VGT and differential time constant KD_VGT are respectively set to values obtained by calculating the basic value and water temperature correction factor by looking up the maps stored in the controller 41, and multiplying these.

In a following step S122, the controller 41 calculates I_VGT by the following equation (16).

$$I\_VGT = I\_VGT_{n-1} + \frac{dT}{KI\_EGR} \cdot DQac \tag{16}$$

where, $I\_VGT_{n-1}$=I_VGT calculated by the routine executed on the immediately preceding occasion.

In a following step S123, predetermined limitation processing is performed on I_VGT.

In a following step S124, D_VGT is calculated by the following equation (17).

$$D\_VGT = (DQac - DQac_{n-1}) \cdot \frac{KD\_VGT}{dT} \tag{17}$$

where, $DQac_{n-1}$=deviation DQac calculated by the routine executed on the immediately preceding occasion.

In a following step S125, the nozzle opening feedback correction amount TRavfb is calculated by the following equation (18).

$$TRavfb = KP\_VGT \cdot (DQac + I\_VGT + D\_VGT) + TRV0\# \tag{18}$$

where, TRV0#=initial value=0.

After this calculation, the controller 41 terminates the routine.

In the block B18, the controller 41 adds the nozzle opening feedback correction amount TRavfb calculated in this way to the first corrected target nozzle opening TRavff, and adds a delay correction related to the response delay of the diaphragm actuator 59 to the result to calculate the second corrected target nozzle opening TRavf. In the block B19, the controller 41 outputs a signal corresponding to the second corrected target nozzle opening TRavf calculated in this way to the diaphragm actuator 59.

In actual control, although a hysteresis correction of the diaphragm actuator 59 and a correction relating to the nonlinear characteristic of the nozzle opening are also added, the detailed description of these corrections are omitted as they are not related to the subject of this invention.

Next, referring to FIG. 24, a routine for calculating the aforesaid excess air factor Rlamb in the cylinder will be described. This routine corresponds to the function of the block B20 in FIG. 4 and is repetitively performed in synchronism with the rotation of the diesel engine 1.

First, in a step S101, the controller 41 reads the intake fresh air amount Qac, the immediately preceding value $TQecd_{n-1}$ of the weighted average value TQecd of the target EGR amount basic value, and the target fuel injection amount Qfc.

In a following step S102, the excess air factor Klamb is calculated by the following equation (19).

$$Klamb = Qac/(Qfc \cdot BLAMB\#) \tag{19}$$

where, BLAMB#=stoichiometric air-fuel ratio.

In a following step S103, the excess air factor Rlamb in the cylinder is calculated by the following equation (20).

$$Rlamb = \frac{Qac + TQecd_{n-1} \cdot \frac{Klamb - 1}{Klamb}}{Qfc \cdot BLAMBA\#} \tag{20}$$

After this calculation, the controller 41 terminates the routine.

Next, referring to FIG. 25, a routine for calculating the real nozzle opening Rvgt will be described.

This routine corresponds to the function of the block B22 in FIG. 4, and is performed at an interval of ten milliseconds during the running of the diesel engine 1.

First, in a step S111, the controller 41 reads the first corrected target nozzle opening TRavff calcu89lated in the block B18.

In a following step S112, the real nozzle opening Rvgt is calculated by the following equation (21).

$$Rvgt = TRavff \cdot TCVGT\# + Rvgt_{n-1} \cdot (1 - TCVGT\#) \quad (21)$$

where, TCVGT#=time constant equivalent value, and
$Rvgt_{n-1}$=real nozzle opening Rvgt calculated by the routine executed on the immediately preceding occasion.

Equation (21) is based on the concept that the real nozzle opening Rvgt varies with a first order delay relative to the first corrected target nozzle opening TRavff.

As a result of the above control due to the controller 41, when the premixed combustion flag F_MK is unity, the opening of the EGR valve 6 and the variable nozzle 53 of the turbocharger 50 are respectively controlled based on the target excess air factor and target EGR rate for premixed combustion. When the premixed combustion flag F_MK is not unity, the opening of the EGR valve 6 and the variable nozzle 53 of the turbocharger 50 are respectively controlled based on the target excess air factor and target EGR rate for diffusive combustion.

When the premixed combustion flag F_MK changes over from unity to zero or vice versa, the target excess air factor and a target EGR rate also change over immediately.

In other words, the transition region between the premixed combustion and diffusive combustion is not set, and in the premixed combustion region, an excess air factor and EGR rate optimized for premixed combustion are applied, and in the diffusive combustion region, an excess air factor and EGR rate optimized for diffusive combustion are applied, respectively.

Therefore, increase in the discharge of NOx or PM in the transition region in the above-mentioned prior art example is prevented.

Figure 32:
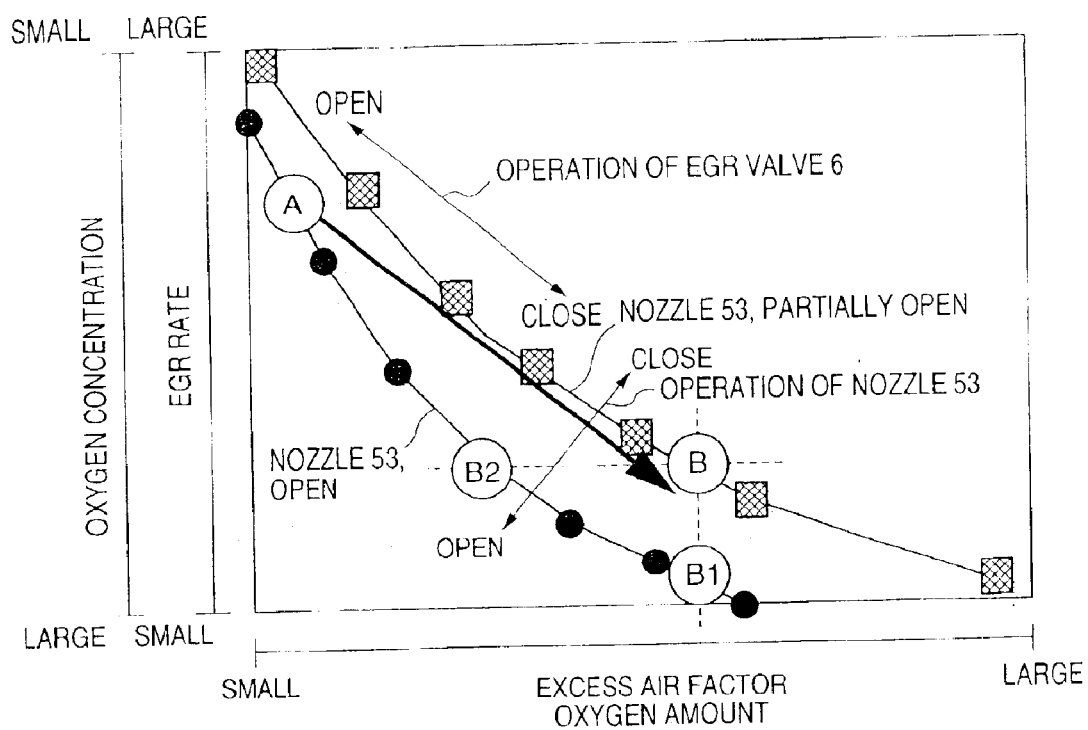
FIG. 32 is a diagram describing a variation of a fresh air amount and EGR rate under the control by the controller.

Next, referring to FIG. 32, the variation of the fresh air amount and target EGR rate during premixed combustion, and the variation of the fresh air amount and target EGR rate during diffusive combustion, will be described.

One of the two kinds of curves shown in the diagram represents the relation between the EGR rate and fresh air amount when the opening of the EGR valve 6 varies with the variable nozzle 53 fully open.

The other of the two kinds of curves represents the relation between the EGR and fresh air amount when the opening of the EGR valve 6 varies with the variable nozzle 53 partially open.

The case will be considered where, in the transient running state of the diesel engine 1, the target fresh air amount and target EGR rate vary from Point A to Point B in the figure.

When the diesel engine 1 is performing premixed combustion, the EGR rate is first controlled from Point A to Point B2 by execution of the aforesaid routines, and the target fresh air amount is then controlled from the point B2 to the Point B.

When the diesel engine 1 is performing diffusive combustion, the fresh air amount is first controlled by execution of the above routines from Point A to Point B1. This control is performed by control of the EGR valve 6 as mentioned above. Subsequently, the EGR rate is controlled from the Point B1 to Point B.

Figure 33A:
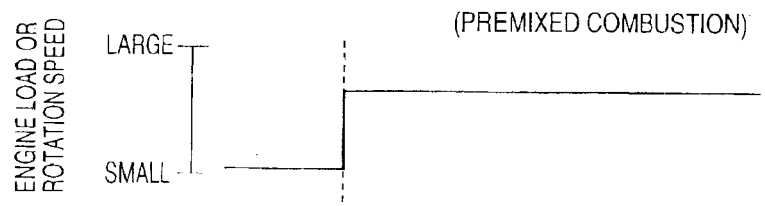
FIGS. 33A–33F are timing charts describing the variation of the EGR rate and intake air amount under the control by the controller.
Figure 33B:
Figure 33C:
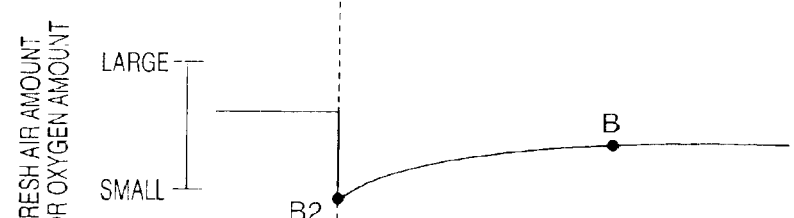

Referring to FIGS. 33A–33C, in the premixed combustion, when the load or rotation speed of the diesel engine 1 increases as shown in FIG. 33A, the EGR rate is controlled to a target value by operation of the EGR valve 6 as shown in FIG. 33B. The point B2 corresponds to the point B2 of FIG. 32.

In addition, advance processing is performed on the signal output to the EGR valve 6 as mentioned above to make the EGR rate coincide rapidly with the target value.

On the other hand, the fresh air amount will be in the state where it was less than the target value as shown in FIG. 33C, as a result of control by this EGR valve 6.

After the EGR rate coincides with the target value, due to the opening control of the EGR valve 6 and variable nozzle 53, the fresh air amount gradually increases to the target value while maintaining the EGR rate at the target value. Consequently, the EGR rate and the fresh air amount both coincide with the target values at the point B in the figure.

Figure 33D:
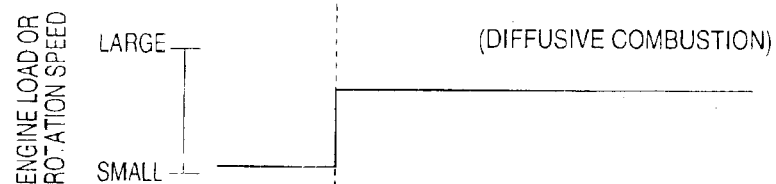
Figure 33E:
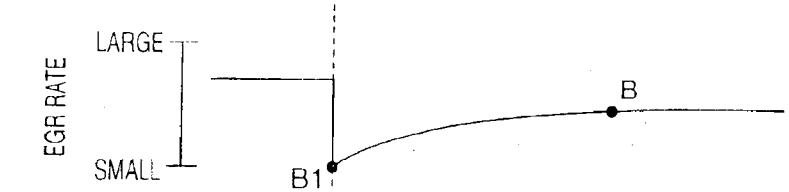
Figure 33F:
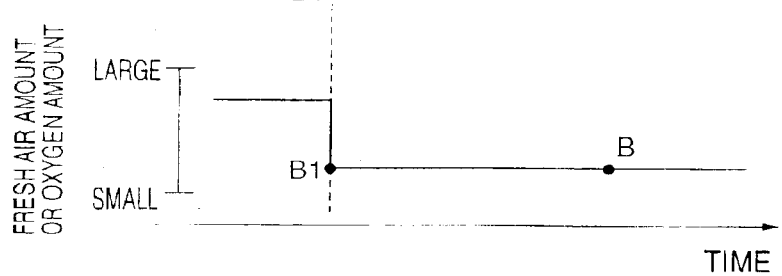

Referring to FIGS. 33D–33E, in the diffusive combustion, when the load or rotation speed of the diesel engine 1 increases as shown in FIG. 33D, the fresh air amount is controlled to a target value by operation of the EGR valve 6 as shown in FIG. 33F. The point B1 corresponds to the point B1 of FIG. 32.

However, the EGR rate undershoots the target value in order to make the fresh air amount coincide with the target value. Also, advance processing is performed on the signal output to the EGR valve 6 as mentioned above to make the fresh air amount coincide rapidly with the target value. Therefore, the output signal to the EGR valve 6 is a value which further undershoots the actual variation of EGR rate. After the fresh air amount coincides with the target value, the EGR rate is increased to the target value due to the opening control of the EGR valve 6 and variable nozzle 32 while maintaining the fresh air amount at the target value. Consequently, both the EGR rate and fresh air amount coincide with the target values at the Point B in the figure.

Herein, control of fresh air amount is equal to control of the excess air factor. Thus, PM in the exhaust gas can be reduced by giving priority to EGR rate control in the premixed combustion state and giving priority to fresh air amount control in the diffusive combustion state, relative to a variation of the load or rotation speed of the diesel engine 1.

The contents of Tokugan 2001-131640, with a filing date of Apr. 17, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, the diesel engine 1 is provided with the turbocharger 50 which has the variable nozzle 53 according to the above embodiment, but the turbocharger 50 is not limited to this type. Any variable geometric turbocharger which can change the geometry of the exhaust gas turbine, such as a turbocharger provided with scrolling or a diffuser which varies the cross-section of the exhaust gas passage of the turbine can also be used. This invention may also be applied to a diesel engine provided with a turbocharger of fixed capacity provided with a waist gate valve.

The embodiments of this invention in which an exclusive property or privilege is claimed are defined as follows:

INDUSTRIAL FIELD OF APPLICATION

As stated above, this invention immediately controls the oxygen concentration or oxygen amount of the cylinder intake gas to a new target value when the type of combustion of the diesel engine has changed. Therefore, increase in the discharge of NOx and PM due to a variation in the type of combustion is suppressed, and a desirable effect on the exhaust gas purification of the diesel engine is achieved.

What is claimed is:

1. A combustion control device of a diesel engine, the diesel engine performing combustion of a mixture of a fuel and an aspirated gas, the device comprising:

a mechanism which regulates an oxygen concentration of the aspirated gas based on a target oxygen concentration and an oxygen amount of the aspirated gas based on a target oxygen amount;

a sensor which detects a running state of the diesel engine; and a programmable controller programmed to:

select any one of a diffusive combustion and a premixed combustion with respect to the combustion of the mixture based on the running state of the diesel engine;

calculate, when the diffusive combustion is selected, the target oxygen concentration and the target oxygen amount adapted for the diffusive combustion based on the running state of the diesel engine;

calculate, when the premixed combustion is selected, the target oxygen concentration and the target oxygen amount adapted for the premixed combustion based on the running state of the diesel engine; and control the regulating mechanism to immediately shift the target oxygen concentration and the target oxygen amount to calculated values;

wherein the diesel engine comprises a turbocharger and the regulating mechanism comprises a mechanism which regulates a turbocharging pressure of the turbocharger.

2. The combustion control device as defined in claim 1, wherein the turbocharging pressure regulating mechanism comprises a variable nozzle which varies a nozzle opening for varying the turbocharging pressure, the controller is further programmed to set a target nozzle opening for the diffusive combustion when the diffusive combustion is selected, set a target nozzle opening for the premixed combustion which is different from the target nozzle opening for the diffusive combustion, when the premixed combustion is selected, and control the nozzle opening of the variable nozzle to coincide with the target nozzle opening.

3. A diesel engine including the combustion control device as defined in claim 1.

4. A combustion control device of a diesel engine, the diesel engine performing combustion of a mixture of a fuel and an aspirated gas, the device comprising:

a mechanism which regulates an oxygen concentration of the aspirated gas based on a target oxygen concentration and an oxygen amount of the aspirated gas based on a target oxygen amount;

a sensor which detects a running state of the diesel engine; and a programmable controller programmed to:

select any one of a diffusive combustion and a premixed combustion with respect to the combustion of the mixture based on the running state of the diesel engine;

calculate, when the diffusive combustion is selected, the target oxygen concentration and the target oxygen amount adapted for the diffusive combustion based on the running state of the diesel engine;

calculate, when the premixed combustion is selected, the target oxygen concentration and the target oxygen amount adapted for the premixed combustion based on the running state of the diesel engine;

control the regulating mechanism to immediately shift the target oxygen concentration and the target oxygen amount to calculated values;

control the regulating mechanism to achieve the target oxygen concentration prior to achieving the target oxygen amount when the premixed combustion is selected; and control the regulating mechanism to achieve the target oxygen amount prior to achieving the target oxygen concentration when the diffusive combustion is selected.

5. A diesel engine including the combustion control device as defined in claim 4.

6. The combustion control device as defined in claim 4, wherein the controller is further programmed to calculate the target oxygen concentration by applying a delay correction to a value calculated according to the diesel engine running state when the premixed combustion is selected, and calculate the target oxygen amount by applying a delay correction to a value calculated according to the diesel engine running state when the diffusive combustion is selected.

7. A diesel engine including the combustion control device as defined in claim 6.

8. The combustion control device as defined in claim 4, wherein the target oxygen amount that the controller calculates when the diffusive combustion is selected is larger than the target oxygen amount that the controller calculates when the premixed combustion is selected.

9. A diesel engine including the combustion control device as defined in claim 8.

10. The combustion control device as defined in claim 4, wherein the target oxygen concentration that the controller calculates when the premixed combustion is selected is larger than the target oxygen concentration that the controller calculates when the diffusive combustion is selected.

11. A diesel engine including the combustion control device as defined in claim 10.

12. The combustion control device as defined in claim 4, wherein the diesel engine comprises an exhaust gas recirculation device and the regulating mechanism comprises a mechanism which regulates an exhaust gas recirculation amount of the exhaust gas recirculation device.

13. A diesel engine including the combustion control device as defined in claim 12.

14. The combustion control device as defined in claim 12, wherein the controller is further programmed to calculate a target effective exhaust gas recirculation rate as the target oxygen concentration based on a calculation of residual oxygen in an exhaust gas of the diesel engine, and calculate a target effective excess air factor as the target oxygen amount based on a calculation of residual oxygen in an exhaust gas recirculated by the exhaust gas recirculation device.

15. A diesel engine including the combustion control device as defined in claim 14.

16. A combustion control device of a diesel engine, the diesel engine performing combustion of a mixture of a fuel and an aspirated gas, the device comprising:

means for regulating an oxygen concentration of the aspirated gas based on a target oxygen concentration and an oxygen amount of the aspirated gas based on a target oxygen amount;

means for detecting a running state of the diesel engine;

means for selecting any one of a diffusive combustion and a premixed combustion with respect to the combustion of the mixture based on the running state of the diesel engine;

means for calculating, when the diffusive combustion is selected, the target oxygen concentration and the target oxygen amount adapted for the diffusive combustion based on the running state of the diesel engine;

means for calculating, when the premixed combustion is selected, the target oxygen concentration and the target oxygen amount adapted for the premixed combustion based on the running state of the diesel engine;

means for controlling the regulating mechanism to immediately shift the target oxygen concentration and the target oxygen amount to calculated values; and means for controlling the regulating mechanism to achieve the target oxygen concentration prior to achieving the target oxygen amount when the premixed combustion is selected, and for controlling the regulating mechanism to achieve the target oxygen amount prior to achieving the target oxygen concentration when the diffusive combustion is selected.

17. A diesel engine including the combustion control device as defined in claim 16.

18. A combustion control method of a diesel engine, the diesel engine performing combustion of a mixture of a fuel and an aspirated gas and comprising a mechanism for regulating an oxygen concentration of the aspirated gas based on a target oxygen concentration and an oxygen amount of the aspirated gas based on a target oxygen amount, the method comprising:

detecting a running state of the diesel engine;

selecting any one of a diffusive combustion and a premixed combustion with respect to the combustion of the mixture based on the running state of the diesel engine;

calculating, when the diffusive combustion is selected, the target oxygen concentration and the target oxygen amount adapted for the diffusive combustion based on the running state of the diesel engine;

calculating, when the premixed combustion is selected, the target oxygen concentration and the target oxygen amount adapted for the premixed combustion based on the running state of the diesel engine;

controlling the regulating mechanism to immediately shift the target oxygen concentration and the target oxygen amount to calculated values;

controlling the regulating mechanism to achieve the target oxygen concentration prior to achieving the target oxygen amount when the premixed combustion is selected; and controlling the regulating mechanism to achieve the target oxygen amount prior to achieving the target oxygen concentration when the diffusive combustion is selected.

* * * * *